(12) United States Patent
Yamamoto et al.

(10) Patent No.: US 11,394,053 B2
(45) Date of Patent: Jul. 19, 2022

(54) COMPOSITION FOR FORMING LITHIUM REDUCTION RESISTANT LAYER, METHOD FOR FORMING LITHIUM REDUCTION RESISTANT LAYER, AND LITHIUM SECONDARY BATTERY

(71) Applicant: SEIKO EPSON CORPORATION, Tokyo (JP)

(72) Inventors: Hitoshi Yamamoto, Chino (JP); Tomofumi Yokoyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 229 days.

(21) Appl. No.: 16/720,576

(22) Filed: Dec. 19, 2019

(65) Prior Publication Data

US 2020/0144663 A1    May 7, 2020

Related U.S. Application Data

(62) Division of application No. 14/863,920, filed on Sep. 24, 2015, now abandoned.

(30) Foreign Application Priority Data

Sep. 30, 2014  (JP) .................................. 2014-200022
Mar. 26, 2015  (JP) .................................. 2015-064331

(51) Int. Cl.
  *H01M 10/0562*  (2010.01)
  *H01M 10/0525*  (2010.01)
  (Continued)

(52) U.S. Cl.
CPC .......... *H01M 10/0562* (2013.01); *C09D 1/00* (2013.01); *C09D 5/24* (2013.01); *H01M 4/1391* (2013.01);
(Continued)

(58) Field of Classification Search
CPC . H01M 6/18; H01M 6/187; H01M 2300/0077
See application file for complete search history.

(56) References Cited

U.S. PATENT DOCUMENTS 8,986,895 B2    3/2015  Ohta et al.
2009/0092903 A1    4/2009  Johnson et al.
(Continued)

FOREIGN PATENT DOCUMENTS

JP    2011159528 A    8/2011
JP    5083336 B2    11/2012
(Continued)

OTHER PUBLICATIONS

Ohta, et al. "High lithium ionic conductivity in the garnet-type oxide Li7-x La3 (Zr2-x, Nbx) O12 (X=0-2)" (2011). Journal of Power Sources vol. 196, pp. 3342-3345.
(Continued)

*Primary Examiner* — Jeremiah R Smith
(74) *Attorney, Agent, or Firm* — Oliff PLC

(57) ABSTRACT

A composition for forming a lithium reduction resistant layer includes a solvent, and a lithium compound, a lanthanum compound, a zirconium compound, and a compound containing a metal M, each of which shows solubility in the solvent, and in which with respect to the stoichiometric composition of a compound represented by the general formula (I), the lithium compound is contained in an amount 1.05 times or more and 2.50 times or less, the lanthanum compound and the zirconium compound are contained in an amount 0.70 times or more and 1.00 times or less, and the compound containing a metal M is contained in an equal amount.

$$Li_{7-x}La_3(Zr_{2-x},M_x)O_{12} \qquad (I)$$

9 Claims, 8 Drawing Sheets

(51) Int. Cl.
*C09D 5/24* (2006.01)
*H01M 4/1397* (2010.01)
*H01M 4/62* (2006.01)
*H01M 10/0585* (2010.01)
*H01M 4/1391* (2010.01)
*C09D 1/00* (2006.01)
*H01M 50/46* (2021.01)
*H01M 50/403* (2021.01)
*H01M 50/431* (2021.01)
*H01M 6/18* (2006.01)

(52) U.S. Cl.
CPC .......... *H01M 4/1397* (2013.01); *H01M 4/62* (2013.01); *H01M 10/0525* (2013.01); *H01M 10/0585* (2013.01); *H01M 50/403* (2021.01); *H01M 50/46* (2021.01); *H01M 6/18* (2013.01); *H01M 6/187* (2013.01); *H01M 50/431* (2021.01); *H01M 2300/0068* (2013.01); *H01M 2300/0071* (2013.01); *H01M 2300/0077* (2013.01); *H01M 2300/0094* (2013.01)

(56) References Cited

U.S. PATENT DOCUMENTS

| | | | |
|---|---|---|---|
| 2013/0141050 A1* | 6/2013 | Visco | H01M 4/38 429/535 |
| 2014/0022436 A1 | 1/2014 | Kim et al. | |
| 2014/0084503 A1* | 3/2014 | Badding | C01B 25/45 264/6 |
| 2014/0287305 A1* | 9/2014 | Wachsman | H01M 10/054 429/211 |
| 2015/0056520 A1 | 2/2015 | Thokchom et al. | |
| 2015/0099188 A1* | 4/2015 | Holme | H01M 10/0562 429/231.95 |
| 2015/0171428 A1* | 6/2015 | Fujiki | H01M 10/0562 429/304 |
| 2015/0200420 A1 | 7/2015 | Holme et al. | |
| 2016/0293988 A1* | 10/2016 | Sakamoto | C04B 35/6365 |

FOREIGN PATENT DOCUMENTS

| | | |
|---|---|---|
| JP | 2012224520 A | 11/2012 |
| JP | 2013-184848 A | 9/2013 |
| JP | 2014154237 A | 8/2014 |
| WO | 2013/130983 A2 | 9/2013 |

OTHER PUBLICATIONS

Thangadurai et al.; "Garnet-type solid-state fast Li ion conductors for Li batteries critical review;" Chem. Soc. Rev.; Mar. 31, 2014; vol. 43; p. 4714-4727.

Adams et al.; "Ion transport and phase transition in Li7-x La3 (Zr2-x Mx) O12 (M=Ta5+, Nb5+, x=0,0.25)"; Journal of Materials Chemistry, Nov. 23, 2011, vol. 22; p. 1426-1434.

Chen et al.; "Sol-gel derived Li—La—Zr—O thin films as solid electrolytes for lithium-ion batteries"; Journal of Materials Chemistry A, Jun. 18, 2014, vol. 2; p. 13277-13282.

\* cited by examiner

COMPOSITION FOR FORMING LITHIUM REDUCTION RESISTANT LAYER, METHOD FOR FORMING LITHIUM REDUCTION RESISTANT LAYER, AND LITHIUM SECONDARY BATTERY

This application is a Divisional of application Ser. No. 14/863,920 filed Sep. 24, 2015, which in turn claims the benefit of Japanese Patent Application No. 2014-200022 filed on Sep. 30, 2014 and No. 2015-064331 filed on Mar. 26, 2015. The disclosure of the prior applications is hereby incorporated by reference herein in its entirety

BACKGROUND

1. Technical Field

Several aspects of the present invention relate to a composition for forming a lithium reduction resistant layer, a method for forming a lithium reduction resistant layer, and a lithium secondary battery.

2. Related Art

As a power source for many electrical devices such as portable information devices, a lithium secondary battery has been used. This lithium secondary battery includes a positive electrode, a negative electrode, and an electrolyte layer which is disposed between the layers of these electrodes and mediates conduction of lithium ions.

Recently, as a lithium secondary battery having a high energy density and safety, an all-solid-state lithium battery using a solid electrolyte as a constituent material of an electrolyte layer, in other words, an all-solid-state lithium battery including a solid electrolyte layer has been proposed.

As a constituent material of the solid electrolyte layer included in such an all-solid-state lithium battery, a material containing a compound represented by the following general formula (A) (hereinafter simply referred to as "Compound A") has been known (see, for example, Japanese Patent No. 5083336 (PTL 1), and S. Ohta, T. Kobayashi, T. Asaoka, J. Power Sources, 196, 3342 (2011) (NPL 1)).

$$Li_{7-x}La_3(Zr_{2-x},Nb_x)O_{12} \quad (A)$$

In the formula (A), X represents 0 to 2.

When this solid electrolyte layer is formed, in PTL 1 and NPL 1, Compound A is produced by a solid phase reaction. Specifically, according to the stoichiometric composition of Compound A, an Li compound, an La compound, a Zr compound, and an Nb compound are mixed in equivalent amounts with respect to Compound A on a molar ratio basis, and the obtained mixture is temporarily fired. Then, in order to compensate a loss of Li in the final sintering which is a post-process, an Li compound is added in an amount of 4 to 20 atom % in terms of Li with respect to the amount of Li in Compound A, and thereafter, the final sintering is performed in a high temperature range, for example, from 900° C. to 1150° C., whereby Compound A is produced.

Further, Compound A to be obtained as described above has excellent Li ion conductivity and also has excellent Li reduction resistance. Therefore, it is contemplated that, for example, in the case where a negative electrode is constituted by lithium, an all-solid-state lithium secondary battery is configured to include a lithium reduction resistant layer between the negative electrode and a solid electrolyte layer, and the lithium reduction resistant layer is configured to contain Compound A for the purpose of suppressing or preventing the occurrence of a short circuit caused by the rupture in this lithium reduction resistant layer or the occurrence of the growth of a dendrite.

However, when a lithium reduction resistant layer is formed by the above-mentioned solid phase reaction, particles forming the solid electrolyte layer and the lithium reduction resistant layer come in point-contact with each other at an interface between these layers. Due to this, although the lithium reduction resistant layer itself has excellent Li ion conductivity, it cannot be said that excellent Li ion conductivity is obtained at the interface.

SUMMARY

An advantage of some aspects of the invention is to provide a composition for forming a lithium reduction resistant layer, with which a lithium reduction resistant layer having excellent Li ion conductivity and Li reduction resistance can be formed, a method for forming a lithium reduction resistant layer using the composition for forming a lithium reduction resistant layer, and a lithium secondary battery including the lithium reduction resistant layer.

Such an advantage is achieved by the invention described below.

A composition for forming a lithium reduction resistant layer according to an aspect of the invention includes: a solvent; a lithium compound; a lanthanum compound; a zirconium compound; and a compound containing a metal M, wherein the lithium compound, the lanthanum compound, the zirconium compound, and the compound containing a metal M each show solubility in the solvent, the lithium compound is contained in an amount 1.05 times or more and 2.50 times or less with respect to the stoichiometric composition of a compound represented by the general formula (I), the lanthanum compound is contained in an amount 0.70 times or more and 1.00 times or less with respect to the stoichiometric composition of the compound represented by the general formula (I), the zirconium compound is contained in an amount 0.70 times or more and 1.00 times or less with respect to the stoichiometric composition of the compound represented by the general formula (I), and the compound containing a metal M is contained in an equal amount with respect to the stoichiometric composition of the compound represented by the general formula (I).

$$Li_{7-x}La_3(Zr_{2-x},M_x)O_{12} \quad (I)$$

In the formula (I), the metal M represents at least one metal selected from Nb, Sc, Ti, V, Y, Hf, Ta, Al, Si, Ga, Ge, Sn, and Sb, and X represents 0 to 2.

According to the composition for forming a lithium reduction resistant layer having such a compositional ratio, a lithium reduction resistant layer having excellent Li ion conductivity and Li reduction resistance can be formed.

In the aspect of the invention, it is preferred that the lithium compound is at least one compound selected from a lithium metal salt compound and a lithium alkoxide compound, the lanthanum compound is at least one compound selected from a lanthanum metal salt compound and a lanthanum alkoxide compound, the zirconium compound is at least one compound selected from a zirconium metal salt compound and a zirconium alkoxide compound, and the compound containing a metal M is at least one compound selected from a metal salt compound of the metal M and a metal alkoxide compound of the metal M.

With this configuration, the compound represented by the general formula (I) can be obtained at a high production ratio from the composition for forming a lithium reduction resistant layer, which is a mixture of these compounds.

In the aspect of the invention, it is preferred that the solvent is any of water, a single organic solvent, a mixed solvent containing water and at least one organic solvent, and a mixed solvent containing at least two or more organic solvents.

With this configuration, each of the lithium compound, the lanthanum compound, the zirconium compound, and the compound containing a metal M can be reliably dissolved in the composition for forming a lithium reduction resistant layer.

A method for forming a lithium reduction resistant layer according to another aspect of the invention includes: forming a liquid coating film using the composition for forming a lithium reduction resistant layer according to the aspect of the invention; and heating the liquid coating film, wherein a lithium reduction resistant layer containing the compound represented by the general formula (I) is obtained.

According to such a method for forming a lithium reduction resistant layer, a lithium reduction resistant layer having excellent Li ion conductivity and Li reduction resistance can be formed.

In the aspect of the invention, it is preferred that the liquid coating film is formed by using a coating method.

According to the coating method, a liquid coating film having a uniform film thickness, and as a result, a lithium reduction resistant layer having a uniform film thickness can be easily formed.

In the aspect of the invention, it is preferred that the heating of the liquid coating film includes a first heating treatment for drying the liquid coating film, a second heating treatment for producing metal oxides of lithium, lanthanum, zirconium, and the metal M, and a third heating treatment for producing and sintering the compound represented by the general formula (I).

With this configuration, in the lithium reduction resistant layer, the compound represented by the general formula (I) can be formed to have a cubic garnet-type crystal structure, and also adjacent crystals of the compound represented by the general formula (I) in the form of particles can be sintered with each other, and therefore, the lithium reduction resistant layer shows more excellent ion conductivity.

In the aspect of the invention, it is preferred that the heating temperature in the first heating treatment is 50° C. or higher and 250° C. or lower.

With this configuration, the compound represented by the general formula (I) having a cubic garnet-type crystal structure can be obtained at a higher production ratio.

In the aspect of the invention, it is preferred that the heating temperature in the second heating treatment is 400° C. or higher and 550° C. or lower.

With this configuration, the compound represented by the general formula (I) having a cubic garnet-type crystal structure can be obtained at a higher production ratio.

In the aspect of the invention, it is preferred that the heating temperature in the third heating treatment is 600° C. or higher and 900° C. or lower.

With this configuration, the compound represented by the general formula (I) having a cubic garnet-type crystal structure can be obtained at a higher production ratio.

A lithium secondary battery according to still another aspect of the invention includes: a solid electrolyte layer; and a lithium reduction resistant layer disposed in contact with the solid electrolyte layer, wherein the lithium reduction resistant layer contains a compound represented by the general formula (I), and an interface between the lithium reduction resistant layer and the solid electrolyte layer is a continuous layer of the lithium reduction resistant layer and the solid electrolyte layer.

$$Li_{7-x}La_3(Zr_{2-x}M_x)O_{12} \qquad (I)$$

In the formula (I), the metal M represents at least one metal selected from Nb, Sc, Ti, V, Y, Hf, Ta, Al, Si, Ga, Ge, Sn, and Sb, and X represents 0 to 2.

With this configuration, the lithium ion conductivity between the lithium reduction resistant layer and the solid electrolyte layer is further improved.

In the aspect of the invention, it is preferred that the lithium secondary battery further includes an active material molded body, and the active material molded body is provided such that a first surface which is apart of the surface thereof is in contact with the lithium reduction resistant layer, and a second surface which is a surface other than the first surface is in contact with the solid electrolyte layer, and in the first surface, at an interface between the lithium reduction resistant layer and the active material molded body, a continuous layer of the lithium reduction resistant layer and the active material molded body is formed.

With this configuration, the lithium ion conductivity between the lithium reduction resistant layer and the solid electrolyte layer and between the lithium reduction resistant layer and the active material molded body is further improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a composition for forming a lithium reduction resistant layer, a method for forming a lithium reduction resistant layer, and a lithium secondary battery according to the invention will be described in detail based on embodiments shown in the accompanying drawings.

In the following, prior to the description of the composition for forming a lithium reduction resistant layer and the method for forming a lithium reduction resistant layer according to the invention, first, the lithium secondary battery according to the invention will be described.

Lithium Secondary Battery

First Embodiment

Figure 1:
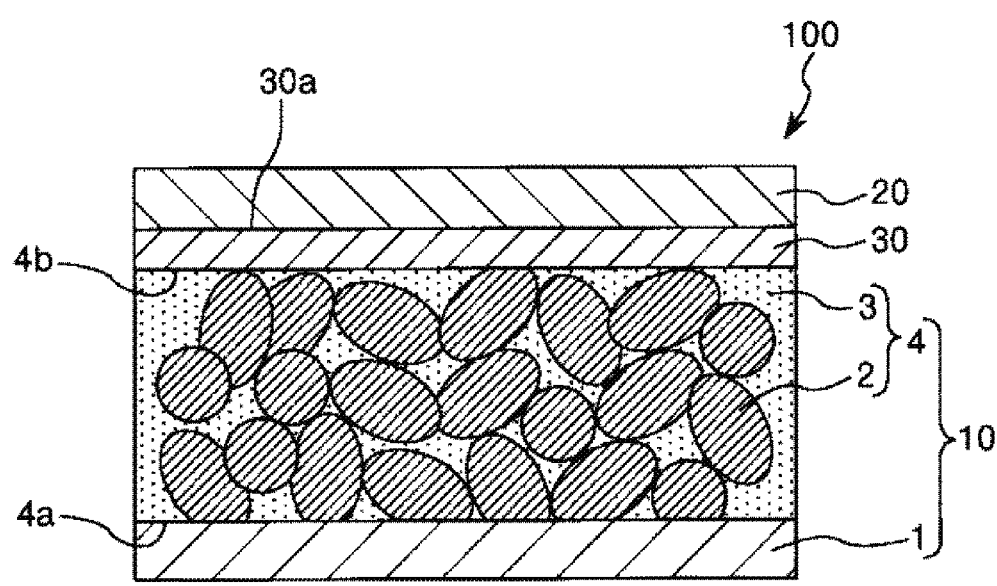
FIG. 1 is a longitudinal cross-sectional view showing a first embodiment of a lithium secondary battery according to the invention.

FIG. 1 is a longitudinal cross-sectional view showing a first embodiment of a lithium secondary battery according to the invention. In the following description, for the sake of convenience of explanation, the upper side of FIG. 1 is referred to as "upper", and the lower side of FIG. 1 is referred to as "lower". Further, in FIG. 1, dimensions, ratios, and the like of respective components are appropriately made different from actual ones in order to make the drawing easy to see.

A lithium secondary battery 100 includes an electrode assembly 10, a lithium reduction resistant layer 30 bonded on the electrode assembly 10, and an electrode 20 bonded on the lithium reduction resistant layer 30. This lithium secondary battery 100 is a so-called all-solid-state lithium-ion secondary battery.

As shown in FIG. 1, the electrode assembly 10 includes a current collector 1, an active material molded body 2, and a solid electrolyte layer 3. Hereinafter, a structure in which the active material molded body 2 and the solid electrolyte layer 3 are combined is referred to as "composite body 4". This composite body 4 is positioned between the current collector 1 and the lithium reduction resistant layer 30 and bonded to these members on a pair of surfaces facing each other.

The current collector 1 is an electrode for taking out an electric current produced by a battery reaction, and is provided in contact with the active material molded body 2 exposed from the solid electrolyte layer 3 on one surface 4a of the composite body 4.

In the case where the active material molded body 2, which will be described later, is constituted by a positive electrode active material, this current collector 1 functions as a positive electrode, and in the case where the active material molded body 2 is constituted by a negative electrode active material, this current collector 1 functions as a negative electrode.

As a material (constituent material) for forming the current collector 1, for example, one type of metal (a metal simple substance) selected from the group consisting of copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd), an alloy containing two or more types of metal elements selected from this group, or the like can be used.

The form of the current collector 1 is not particularly limited, and examples thereof include a plate, a foil, and a mesh. The surface of the current collector 1 may be smooth, or may have irregularities formed thereon.

The active material molded body 2 is a porous molded body composed of an inorganic electrode active material (constituent material).

A plurality of pores of the active material molded body 2 constituted by such a porous body form communication holes which communicate with one another like a mesh inside the active material molded body 2.

By appropriately selecting the type of the constituent material to be contained in this active material molded body 2, the current collector 1 can serve as a positive electrode or a negative electrode.

In the case where the current collector 1 is used as a positive electrode, as the constituent material of this active material molded body 2, for example, a known lithium composite oxide can be used as a positive electrode active material.

The term "lithium composite oxide" as used herein refers to an oxide inevitably containing lithium, and also containing two or more types of metal ions as a whole, but free of oxoacid ions.

Examples of such a lithium composite oxide include $LiCoO_2$, $LiNiO_2$, $LiMn_2O_4$, $Li_2Mn_2O_3$, $LiFePO_4$, $Li_2FeP_2O_7$, $LiMnPO_4$, $LiFeBO_3$, $Li_3V_2(PO_4)_3$, $Li_2CuO_2$, $LiFeF_3$, $Li_2FeSiO_4$, and $Li_2MnSiO_4$. Further, solid solutions obtained by substituting some atoms in a crystal of any of these lithium composite oxides with a transition metal, a typical metal, an alkali metal, an alkaline rare earth element, a lanthanoid, a chalcogenide, a halogen, or the like are also included in the lithium composite oxide, and also any of these solid solutions can be used as the positive electrode active material.

In the case where the current collector 1 is used as a negative electrode, as the constituent material of this active material molded body 2, for example, a lithium composite oxide such as $Li_4Ti_5O_{12}$ or $Li_2Ti_3O_7$ can be used as a negative electrode active material.

The porosity of the active material molded body 2 is preferably 10% or more and 50% or less, more preferably 30% or more and 50% or less. When the active material molded body 2 has such a porosity, the surface area of the inner surface of each pore of the active material molded body 2 is increased, and also a contact area between the active material molded body 2 and the solid electrolyte layer 3 is easily increased. Accordingly, the capacity of a lithium battery using the electrode assembly 10 is easily increased.

The porosity can be determined according to the following formula (II) from (1) the volume (apparent volume) of the active material molded body 2 including the pores obtained from the external dimension of the active material molded body 2, (2) the mass of the active material molded body 2, and (3) the density of the active material constituting the active material molded body 2.

$$\text{Porosity}(\%) = \left[1 - \frac{\text{mass of active material molded body}}{(\text{apparent volume}) \times (\text{density of active material})}\right] \times 100 \quad \text{(II)}$$

Although a detailed description will be made later, the porosity of the active material molded body 2 can be controlled by using a pore-forming material constituted by an organic material in the form of particles in a step of forming the active material molded body 2.

The resistivity of the active material molded body 2 is preferably 700 Ω/cm or less, more preferably 100 Ω/cm or less. When the active material molded body 2 has such a resistivity, in the case of forming a lithium battery using the electrode assembly 10, a sufficient output power can be obtained.

The resistivity can be determined by adhering a copper foil to be used as the electrode to the surface of the active material molded body 2, and then, performing DC polarization measurement.

The solid electrolyte layer 3 is composed of a solid electrolyte (constituent material), and is provided in contact with the surface of the active material molded body 2 including the inside of the pores of the active material molded body 2.

Examples of the solid electrolyte include oxides, sulfides, halides, and nitrides such as $SiO_2$—$P_2O_5$—$Li_2O$, $SiO_2$—$P_2O_5$—$LiCl$, $Li_2O$—$LiCl$—$B_2O_3$, $Li_{3.4}V_{0.6}Si_{0.4}O_4$, $Li_{14}ZnGe_4O_{16}$, $Li_{3.6}V_{0.4}Ge_{0.6}O_4$, $Li_{1.3}Ti_{1.7}Al_{0.3}(PO_4)_3$, $Li_{2.88}PO_{3.73}N_{0.14}$, $LiNbO_3$, $Li_{0.35}La_{0.55}TiO_3$, $Li_7La_3Zr_2O_{12}$, $Li_2S$—$SiS_2$, $Li_2S$—$SiS_2$—$LiI$, $Li_2S$—$SiS_2$—$P_2S_5$, $LiPON$, $Li_3N$, $LiI$, $LiI$—$CaI_2$, $LiI$—$CaO$, $LiAlCl_4$, $LiAlF_4$, $LiI$—$Al_2O_3$, $LiF$—$Al_2O_3$, $LiBr$—$Al_2O_3$, $Li_2O$—$TiO_2$, $La_2O_3$—$Li_2O$—$TiO_2$, $Li_3NI_2$, $Li_3N$—$LiI$—$LiOH$, $Li_3N$—$LiCl$, $Li_6NBr_3$, $LiSO_4$, $Li_4SiO_4$, $Li_3PO_4$—$Li_4SiO_4$—$Li_4GeO_4$—$Li_3VO_4$, $Li_4$—$SiO_4Li_3VO_4$, $Li_4GeO_4$—$Zn_2GeO_2$, $Li_4SiO_4$—$LiMoO_4$, and $LiSiO_4$—$Li_4ZrO_4$. These solid electrolytes may be crystalline or amorphous. Further, in this specification, also a solid solution obtained by substituting some atoms of any of these compositions with a transition metal, atypical metal, an alkali metal, an alkaline rare earth element, a lanthanoid, a chalcogenide, a halogen, or the like can be used as the solid electrolyte.

By using the compound represented by the following general formula (I) as the solid electrolyte, the interface between the solid electrolyte layer 3 and the lithium reduction resistant layer 30 becomes more uniform, and therefore, the ion conductivity at this interface can be more enhanced.

The ion conductivity of the solid electrolyte layer 3 is preferably $1 \times 10^{-5}$ S/cm or more, more preferably $5 \times 10^{-5}$ S/cm or more. When the solid electrolyte layer 3 has such an ion conductivity, also ions contained in the solid electrolyte layer 3 at a position away from the surface of the active material molded body 2 reach the surface of the active material molded body 2 and can contribute to a battery reaction in the active material molded body 2. Accordingly, the utilization of the active material in the active material molded body 2 is improved, and thus the capacity can be increased. At this time, if the ion conductivity is less than the above-mentioned lower limit, depending on the type of the solid electrolyte layer 3, only the active material in the vicinity of the surface layer of the surface facing a counter electrode contributes to the battery reaction in the active material molded body 2, and therefore, the capacity may be decreased.

The term "ion conductivity of the solid electrolyte layer 3" as used herein refers to the "total ion conductivity", which is the sum of the "bulk conductivity", which is the conductivity of the above-mentioned inorganic electrolyte itself constituting the solid electrolyte layer 3, and the "grain boundary ion conductivity", which is the conductivity between crystal grains when the inorganic electrolyte is crystalline.

The ion conductivity of the solid electrolyte layer 3 can be determined, for example, as follows. A tablet-shaped body obtained by press-molding a solid electrolyte powder at 624 MPa is sintered in an air atmosphere at 700° C. for 8 hours, a platinum electrode having a diameter of 0.5 cm and a thickness of 100 nm is formed on both surfaces of the press-molded body by sputtering, and then, performing an AC impedance method. As the measurement device, for example, an impedance analyzer (model SI-1260, manufactured by Solartron Co., Ltd.) is used.

Although a detailed description will be made later, both surfaces 4a and 4b of the composite body 4 are preferably polished surfaces obtained by a polishing process at the time of production, and the active material molded body 2 is exposed from the solid electrolyte layer 3. Therefore, when such a polishing process is performed, on both surfaces 4a and 4b, a scratch mark (polishing mark), which is a mark of the polishing process is left.

The electrode assembly 10 of this embodiment is molded without using an organic material such as a binder for binding the active materials to each other or a conductive additive for securing the electrical conductivity of the active material molded body 2 when molding the active material molded body 2, and is composed of almost only an inorganic material. Specifically, in the electrode assembly 10 of this embodiment, a mass loss percentage when the composite body 4 (the active material molded body 2 and the solid electrolyte layer 3) is heated to 400° C. for 30 minutes is 5% by mass or less. The mass loss percentage is preferably 3% by mass or less, more preferably 1% by mass or less, and particularly preferably, the mass loss is not observed or is within the limit of error. That is, the mass loss percentage when the composite body 4 is heated to 400° C. for 30 minutes is preferably 0% by mass or more. Since the composite body 4 shows a mass loss percentage as described above, in the composite body 4, a material which is evaporated under predetermined heating conditions such as a solvent or adsorbed water, or an organic material which is vaporized by burning or oxidation under predetermined heating conditions is contained in an amount of only 5% by mass or less with respect to the total mass of the structure.

The mass loss percentage of the composite body 4 can be determined as follows. By using a thermogravimetric/differential thermal analyzer (TG-DTA), the composite body 4 is heated under predetermined heating conditions, and the mass of the composite body 4 after heating under the predetermined heating conditions is measured, and the mass loss percentage is calculated from the ratio between the mass before heating and the mass after heating.

In the electrode assembly 10 of this embodiment, a plurality of pores form communication holes which communicate like a mesh with one another in the active material molded body 2, and also in the solid portion of the active material molded body 2, a mesh structure is formed. For example, $LiCoO_2$ which is a positive electrode active material is known to have anisotropic electron conductivity in crystals. Therefore, when the active material molded body is tried to be formed using $LiCoO_2$ as a constituent material, in the case where the active material molded body has a configuration such that pores are formed by a mechanical process so that the pores are provided extending in a specific direction, electron conduction may possibly hardly take place therein depending on the direction on which crystals show electron conductivity. However, if the pores communicate like a mesh with one another as in the case of the active material molded body 2 and the solid portion of the active material molded body 2 has a mesh structure, an electrochemically smooth continuous surface can be formed regardless of the anisotropic electron conductivity or ion conductivity in crystals. Accordingly, favorable electron conduction can be secured regardless of the type of active material to be used.

Further, in the electrode assembly 10 of this embodiment, since the composite body 4 has a configuration as described above, the addition amount of a binder or a conductive additive contained in the composite body 4 is reduced, and thus, as compared with the case where a binder or a conductive additive is used, the capacity density per unit volume of the electrode assembly 10 is improved.

Further, in the electrode assembly 10 of this embodiment, the solid electrolyte layer 3 is in contact also with the inner surface of each pore of the porous active material molded body 2. Therefore, as compared with the case where the active material molded body 2 is not a porous body or the case where the solid electrolyte layer 3 is not formed in the pores, a contact area between the active material molded body 2 and the solid electrolyte layer 3 is increased, and thus, an interfacial impedance can be decreased. Accordingly, favorable charge transfer at an interface between the active material molded body 2 and the solid electrolyte layer 3 can be achieved.

Further, in the electrode assembly 10 of this embodiment, while the current collector 1 is in contact with the active material molded body 2 exposed on one surface of the composite body 4, the solid electrolyte layer 3 penetrates into the pores of the porous active material molded body 2 and is in contact with the surface of the active material molded body 2 including the inside of each pore and excluding the surface in contact with the current collector 1. It is apparent that in the electrode assembly 10 having such a configuration, a contact area between the active material molded body 2 and the solid electrolyte layer 3 (a second contact area) is larger than a contact area between the current collector 1 and the active material molded body 2 (a first contact area).

If the electrode assembly has a configuration such that the first contact area and the second contact area are the same, since charge transfer is easier at an interface between the current collector 1 and the active material molded body 2 than at an interface between the active material molded body 2 and the solid electrolyte layer 3, the interface between the active material molded body 2 and the solid electrolyte layer 3 becomes a bottleneck of the charge transfer. Due to this, favorable charge transfer is inhibited in the electrode assembly as a whole. However, in the electrode assembly 10 of this embodiment, the second contact area is larger than the first contact area, and therefore, the above-mentioned bottleneck is easily eliminated, and thus, favorable charge transfer can be achieved in the electrode assembly as a whole.

Accordingly, the electrode assembly 10 having the above-mentioned configuration and produced by the production method of this embodiment described below can improve the capacity of a lithium battery using the electrode assembly 10, and also the output power can be increased.

The electrode 20 is provided in contact with the surface of the lithium reduction resistant layer 30 opposite to the surface on which the composite body 4 is formed.

In the case where the active material molded body 2 is constituted by a positive electrode active material, this electrode 20 functions as a negative electrode, and in the case where the active material molded body 2 is constituted by a negative electrode active material, this electrode 20 functions as a positive electrode.

As a material (constituent material) for forming this electrode 20, in the case where the electrode 20 is a negative electrode, for example, lithium (Li) can be used, and in the case where the electrode 20 is a positive electrode, for example, aluminum (Al) can be used.

The thickness of the electrode 20 is not particularly limited, but is, for example, preferably 10 μm or more and 100 μm or less, more preferably 10 μm or more and 30 μm or less.

The lithium reduction resistant layer 30 is provided in contact with the composite body 4 on the other surface 4b and also in contact with the electrode 20 on one surface 30a. This lithium reduction resistant layer 30 is positioned between the composite body 4 and the electrode 20 and bonded to these members on a pair of surfaces 30a and 4b facing each other.

By providing such a lithium reduction resistant layer 30 between the composite body 4 and the electrode 20, the electrode 20 and the current collector 1 are prevented from being connected to each other through the active material molded body 2 in the lithium secondary battery 100, that is, a short circuit can be prevented. In other words, the lithium reduction resistant layer 30 functions as a short circuit prevention layer for preventing a short circuit in the lithium secondary battery 100.

In the invention, this lithium reduction resistant layer 30 contains a compound represented by the following general formula (I) (hereinafter sometimes simply referred to as "Compound I"). This Compound I is a ceramic material having excellent lithium ion conductivity and lithium reduction resistance even at normal temperature. Further, a thin film containing such Compound I has sufficient strength even in the form of a thin film. Due to this, by using a thin film containing this Compound I as the lithium reduction resistant layer 30, the occurrence of a short circuit caused by the rupture of the thin film or the growth of a dendrite due to the reduction of lithium ions can be suppressed or prevented. Therefore, this lithium reduction resistant layer 30 shows excellent lithium ion conductivity and lithium reduction resistance.

$$Li_{7-x}La_3(Zr_{2-x}M_x)O_{12} \quad \text{(I)}$$

In the formula (I), M represents at least one metal selected from Nb, Sc, Ti, V, Y, Hf, Ta, Al, Si, Ga, Ge, Sn, and Sb, and X represents 0 to 2.

In Compound I, examples of the metal M include Nb, Sc, Ti, V, Y, Hf, Ta, Al, Si, Ga, Ge, Sn, and Sb, and among these, one metal can be used or two or more metals can be used in combination. Above all, at least one metal selected from Nb (niobium) and Ta (tantalum) is preferred. According to this, the lithium reduction resistant layer 30 to be obtained can show more excellent lithium ion conductivity and lithium reduction resistance, and also even if the lithium reduction resistant layer 30 is formed into a thin film, the lithium reduction resistant layer 30 can have excellent strength.

Further, X in Compound I, that is, the replacement ratio of the metal M is preferably as large as possible, and although X is not particularly limited, X is preferably 1 or more and 2 or less, more preferably 1.4 or more and 2 or less. If the X is too small, the lithium reduction resistant layer 30 may not be able to sufficiently show the above-mentioned function depending on the type of the metal M or the like.

Further, Compound I may have either a cubic crystal structure or a tetragonal crystal structure in the lithium reduction resistant layer 30, but preferably has a cubic garnet-type crystal structure. According to this, the ion conductivity of the lithium reduction resistant layer 30 is further improved.

The ion conductivity of the lithium reduction resistant layer 30 is preferably $1 \times 10^{-5}$ S/cm or more, more preferably $5 \times 10^{-5}$ S/cm or more. When the lithium reduction resistant layer 30 has such an ion conductivity, ions contained in the lithium reduction resistant layer 30 can be made to reach the surface of the active material molded body 2 and can contribute to a battery reaction in the active material molded body 2. Accordingly, the utilization of the active material in the active material molded body 2 is improved, and thus the capacity can be increased. At this time, if the ion conductivity is less than the above-mentioned lower limit, depending on the type of the lithium reduction resistant layer 30, only the active material in the vicinity of the surface layer of the surface facing a counter electrode contributes to the battery reaction in the active material molded body 2, and therefore, the capacity may be decreased.

The term "ion conductivity of the lithium reduction resistant layer 30" as used herein refers to the "total ion conductivity", which is the sum of the "bulk conductivity", which is the conductivity of the above-mentioned Compound I itself constituting the lithium reduction resistant layer 30, and the "grain boundary ion conductivity", which is the conductivity between crystal grains composed of Compound I.

The ion conductivity of the lithium reduction resistant layer 30 can be determined, for example, as follows. A tablet-shaped body obtained by press-molding a powder of Compound I at 624 MPa is sintered in an air atmosphere at 700° C. for 8 hours, a platinum electrode having a diameter of 0.5 cm and a thickness of 100 nm is formed on both surfaces of the press-molded body by sputtering, and then, performing an AC impedance method. As the measurement device, for example, an impedance analyzer (model SI-1260, manufactured by Solartron Co., Ltd.) is used.

The thickness of the lithium reduction resistant layer 30 is not particularly limited, but is, for example, preferably 1 μm or more and 10 μm or less, more preferably 2 μm or more and 5 μm or less. By setting the thickness in such a range, the lithium reduction resistant layer 30 can reliably show both functions of lithium ion conductivity and lithium reduction resistance.

In this embodiment, the lithium reduction resistant layer 30 having a configuration as described above is provided in contact with the other surface 4b of the composite body 4 as shown in FIG. 1. Further, in the composite body 4, both of the active material molded body 2 and the solid electrolyte layer 3 are exposed on the other surface 4b. Due to this, the lithium reduction resistant layer 30 is in contact with both of the active material molded body 2 and the solid electrolyte layer 3 on the other surface 4b.

At such an interface between the lithium reduction resistant layer 30 and the composite body 4, that is, at an interface between the lithium reduction resistant layer 30 and the active material molded body 2 and at an interface between the lithium reduction resistant layer 30 and the solid electrolyte layer 3, a continuous layer (solid solution) in which the lithium reduction resistant layer 30 and the active material molded body 2 are solid-dissolved, and a continuous layer (solid solution) in which the lithium reduction resistant layer 30 and the solid electrolyte layer 3 are solid-dissolved are formed, respectively. According to this, the resistivity at an interface between the lithium reduction resistant layer 30 and the composite body 4 (the solid electrolyte layer 3 and the active material molded body 2) is decreased, and as a result, the transfer of lithium ions at the interface is carried out more smoothly. In other words, the lithium ion conductivity between the lithium reduction resistant layer 30 and the composite body 4 is further improved. The continuous layer as described above can be obtained by forming the lithium reduction resistant layer 30 on the other surface 4b of the composite body 4 using the composition for forming a lithium reduction resistant layer according to the invention, and the method (the method for forming a lithium reduction resistant layer according to the invention) will be described in detail in a method for producing a lithium secondary battery mentioned below.

The lithium reduction resistant layer 30 constituted by a thin film containing Compound I is constituted by a porous body obtained by sintering particle bodies (secondary particles) formed by granulating crystals (primary particles) of Compound I. Therefore, the lithium reduction resistant layer 30 is configured to include communication holes (pores) which communicate with one another like a mesh, however, it is preferred that in this communication hole, a filling section filled with a filling material which is non-crystalline (vitreous or amorphous) at room temperature is formed. By providing such a filling section, the porous body can be strengthened, and therefore, even if the transfer of lithium ions is carried out in the porous body constituted by Compound I, the shape of the lithium reduction resistant layer 30 can be stabilized.

Examples of a constituent material of this filling section include lithium composite oxides containing Si or B, and specific examples thereof include $Li_2SiO_3$, $Li_6SiO_5$, $Li_3BO_3$, $H_3BO_3$, and $Li_{2+x}BXC_{1-x}O_3$, and one compound can be used or two or more compounds can be used in combination.

Method for Producing Lithium Secondary Battery

Next, a method for producing the lithium secondary battery 100 of the first embodiment shown in FIG. 1 will be described.

FIGS. 2A to 4C are views for illustrating a method for producing the lithium secondary battery shown in FIG. 1. In the following description, for the sake of convenience of explanation, the upper side of FIGS. 2A to 4C is referred to as "upper", and the lower side of FIGS. 2A to 4C is referred to as "lower". Further, in FIGS. 2A to 4C, dimensions, ratios, and the like of respective components are appropriately made different from actual ones in order to make the drawing easy to see.

Figure 2A:
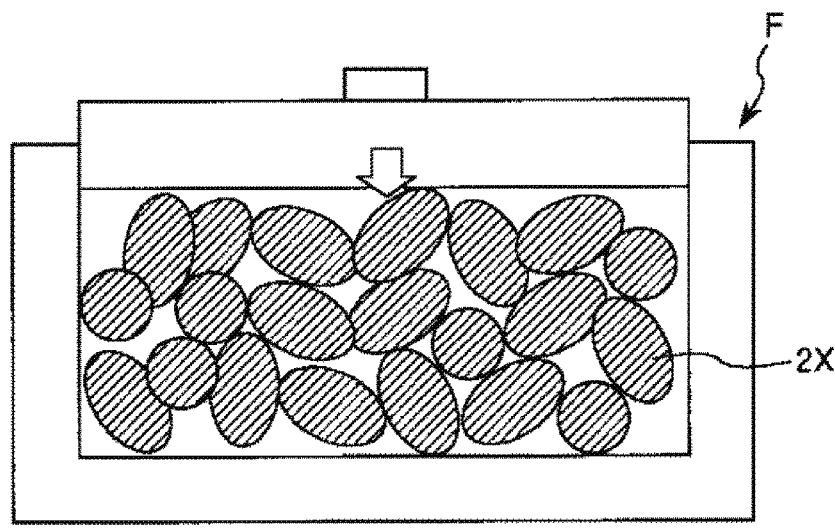
FIGS. 2A and 2B are views for illustrating a method for producing the lithium secondary battery shown in FIG. 1.
Figure 2B:
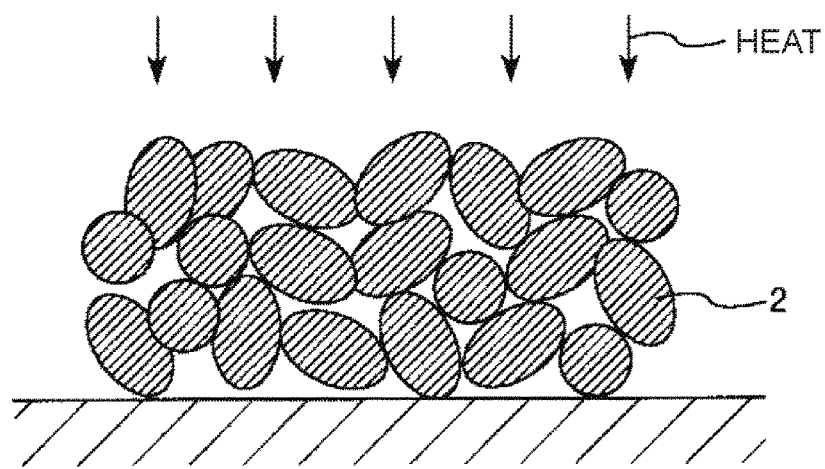

[1] First, as shown in FIGS. 2A and 2B, a constituent material containing a lithium composite oxide in the form of particles (hereinafter referred to as "active material particles 2X") is molded by compression using a mold F (see FIG. 2A), and thereafter, the obtained compression-molded material is subjected to a heat treatment, whereby an active material molded body 2 is obtained (see FIG. 2B).

This heat treatment is preferably performed at a treatment temperature of 850° C. or higher and lower than the melting point of the lithium composite oxide to be used. By this heat treatment, the active material particles 2X are sintered with each other, whereby an integrated molded body can be reliably obtained. By performing the heat treatment at a temperature in such a range, an active material molded body 2 having a resistivity of preferably 700 Ω/cm or less can be obtained without adding a conductive additive. Accordingly, the obtained lithium secondary battery 100 has a sufficient output power.

At this time, if the treatment temperature is lower than 850° C., not only sintering does not sufficiently proceed, but also the electron conductivity itself in the crystals of the active material is decreased depending on the type of the lithium composite oxide to be used, and therefore, the obtained lithium secondary battery 100 may not be able to achieve a desired output power.

Further, if the treatment temperature exceeds the melting point of the lithium composite oxide, lithium ions are excessively volatilized from the inside of the crystals of the lithium composite oxide, and therefore, the electron conductivity of the lithium composite oxide is decreased, and thus, the capacity of the obtained electrode assembly 10 may be decreased.

Accordingly, in order to obtain appropriate output power and capacity, the treatment temperature is preferably 850° C. or higher and lower than the melting point of the lithium composite oxide, more preferably 875° C. or higher and 1000° C. or lower, further more preferably 900° C. or higher and 920° C. or lower.

Further, the heat treatment in this step is performed for preferably 5 minutes or more and 36 hours or less, more preferably 4 hours or more and 14 hours or less.

By performing the heat treatment as described above, grain boundary growth in the active material particles 2X and sintering between the active material particles 2X are allowed to proceed so that the retention of the shape of the obtained active material molded body 2 is facilitated, and thus, the addition amount of a binder in the active material molded body 2 can be decreased. Further, a bond is formed between the active material particles 2X by sintering so as to form an electron transfer pathway between the active material particles 2X, and therefore, the addition amount of a conductive additive can also be decreased. As the constituent material of the active material particles 2X, $LiCoO_2$ can be favorably used.

Further, the obtained active material molded body 2 is constituted by communication holes in which a plurality of pores of the active material molded body 2 communicate with one another like a mesh inside the active material molded body 2.

The average particle diameter of the active material particles 2X is preferably 300 nm or more and 5 μm or less, more preferably 450 nm or more and 3 μm or less, further more preferably 500 nm or more and 1 μm or less. When an active material having such an average particle diameter is used, the porosity of the obtained active material molded body 2 can be set to preferably 10% or more and 40% or less, more preferably 15% or more and 35% or less. As a result, a surface area of the inner surface of each pore of the active material molded body 2 is increased, and also a contact area between the active material molded body 2 and the solid electrolyte layer 3 is easily increased. Accordingly, the capacity of a lithium battery using the electrode assembly 10 is easily increased.

If the average particle diameter of the active material particles 2X is less than the above-mentioned lower limit, the pores of the active material molded body to be formed tend to be small such that the radius of each pore is several tens of nanometers, and it becomes difficult to allow a liquid containing a precursor of the inorganic solid electrolyte to penetrate into each pore in the below-mentioned step depending on the type of the liquid. As a result, it may become difficult to form the solid electrolyte layer 3 which is in contact with the inner surface of each pore.

If the average particle diameter of the active material particles 2X exceeds the above-mentioned upper limit, a specific surface area which is a surface area per unit mass of the active material molded body to be formed is decreased, and thus, a contact area between the active material molded body 2 and the solid electrolyte layer 3 is decreased. Therefore, when forming a lithium battery using the obtained electrode assembly 10, a sufficient output power may not be able to be obtained. Further, the ion diffusion distance from the inside of the active material particle 2X to the solid electrolyte layer 3 is increased, and therefore, it may become difficult for the lithium composite oxide around the center of the active material particle 2X to contribute to the function of a battery.

The average particle diameter of the active material particles 2X can be determined by, for example, dispersing the active material particles 2X in n-octanol at a concentration ranging from 0.1 to 10% by mass, and then, measuring the median diameter using a light scattering particle size distribution analyzer (Nanotrac UPA-EX250, manufactured by Nikkiso Co., Ltd.).

Further, to the constituent material to be used for forming the active material particles 2X, an organic polymer compound such as polyvinylidene fluoride (PVdF) or polyvinyl alcohol (PVA) may be added as a binder. Such a binder is burned or oxidized in the heat treatment in this step, and the amount thereof is reduced.

Further, it is preferred to add a pore-forming material in the form of particles composed of a polymer or a carbon powder to the material to be used for forming the active material particles 2X as a pore template when performing compact molding. By mixing such a pore-forming material, the control of the porosity of the active material molded body is facilitated. Such a pore-forming material is decomposed and removed by burning or oxidation during the heat treatment, and therefore, the amount thereof is reduced in the obtained active material molded body.

The average particle diameter of the pore-forming material is preferably from 0.5 to 10 μm.

Further, it is preferred that the pore-forming material contains particles (primary particles) composed of a deliquescent substance. When the primary particles deliquesce, water generated around the primary particles function as a binder for bonding the lithium composite oxide in the form of particles, and therefore, it becomes possible to maintain the shape while the lithium composite oxide in the form of particles are compression-molded and subjected to a heat treatment. Due to this, the active material molded body can be obtained without adding another binder or while reducing the addition amount of a binder, and an electrode assembly having a high capacity can be easily obtained.

Examples of such primary particles include particles composed of polyacrylic acid.

Further, it is preferred that the pore-forming material further contains particles (secondary particles) composed of a non-deliquescent substance. The pore-forming material containing such secondary particles facilitates handling. Further, when the pore-forming material has deliquescence, the porosity of the active material molded body sometimes deviates from the desired set value depending on the amount of water around the pore-forming material, however, by including the secondary particles which do not deliquesce along with the primary particles in the pore-forming material, it becomes possible to prevent the deviation of the porosity.

Figure 3A:
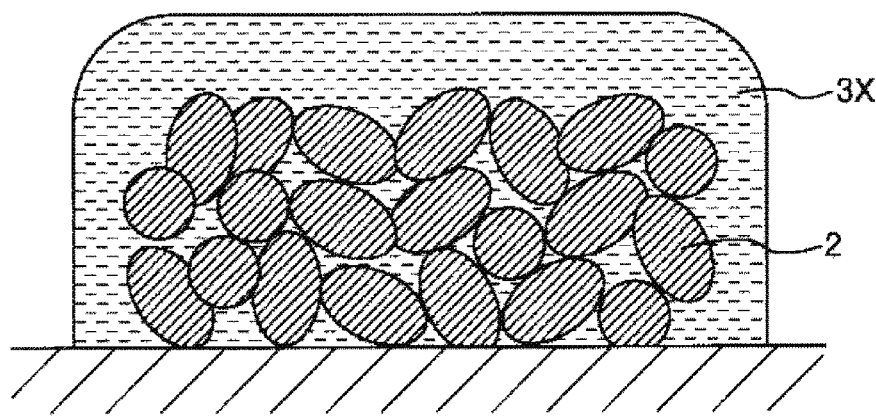
FIGS. 3A and 3B are views for illustrating a method for producing the lithium secondary battery shown in FIG. 1.
Figure 3B:
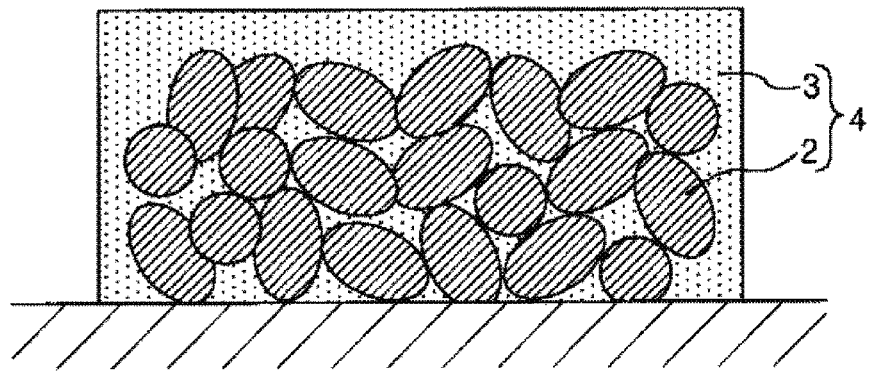

[2] Subsequently, as shown in FIGS. 3A and 3B, a liquid 3X containing a precursor of the solid electrolyte layer 3 is applied to the surface of the active material molded body 2 including the inside of each pore of the active material molded body 2 (FIG. 3A), followed by firing to convert the precursor to the inorganic solid electrolyte, whereby the solid electrolyte layer 3 is formed (FIG. 3B).

By doing this, the composite body 4 including the active material molded body 2 and the solid electrolyte layer 3 is formed.

The liquid 3X may contain a solvent which can dissolve the precursor in addition to the precursor. In the case where the liquid 3X contains a solvent, after applying the liquid 3X, the solvent may be appropriately removed before firing. As the method for removing the solvent, a generally known method such as heating, pressure reduction, or air-blowing, or a method in which two or more such generally known methods are combined can be adopted.

Since the solid electrolyte layer 3 is formed by applying the liquid 3X having fluidity, it becomes possible to favorably form a solid electrolyte also on the inner surface of each fine pore of the active material molded body 2. Accordingly, a contact area between the active material molded body 2 and the solid electrolyte layer 3 is easily increased so that a current density at an interface between the active material molded body 2 and the solid electrolyte layer 3 is decreased, and thus, it becomes easy to obtain a high output power.

The liquid 3X can be applied by any of various methods as long as the method can allow the liquid 3X to penetrate into the inside of the pores of the active material molded body 2. For example, a method in which the liquid 3X is added dropwise to a place where the active material molded body 2 is placed, a method in which the active material molded body 2 is immersed in a place where the liquid 3X is pooled, or a method in which an edge portion of the active material molded body 2 is brought into contact with a place where the liquid 3X is pooled so that the inside of each pore is impregnated with the liquid 3X by utilizing a capillary phenomenon may be adopted. In FIG. 3A, a method in which the liquid 3X is added dropwise using a dispenser D among the above methods is shown.

Examples of the precursor of the solid electrolyte layer 3 include the following precursors (A), (B), and (C): (A) a composition including salts containing metal atoms to be contained in the inorganic solid electrolyte at a ratio according to the compositional formula of the inorganic solid electrolyte, and converted to the inorganic solid electrolyte by oxidation; (B) a composition including metal alkoxides containing metal atoms to be contained in the inorganic solid electrolyte at a ratio according to the compositional formula of the inorganic solid electrolyte; and (C) a dispersion liquid in which the inorganic solid electrolyte in the form of fine particles or a sol in the form of fine particles containing metal atoms to be contained in the inorganic solid electrolyte at a ratio according to the compositional formula of the inorganic solid electrolyte is dispersed in a solvent, or (A), or (B).

The salt to be contained in the composition (A) includes a metal complex. Further, the precursor (B) is a precursor when the inorganic solid electrolyte is formed using a so-called sol-gel method.

The precursor is fired in an air atmosphere at a temperature lower than the temperature in the heat treatment for obtaining the active material molded body 2 described above. Specifically, the firing may be performed at a temperature of 300° C. or higher and 700° C. or lower. By the firing, the inorganic solid electrolyte is produced from the precursor, thereby forming the solid electrolyte layer 3. As the constituent material of the solid electrolyte layer, $Li_{0.35}La_{0.55}TiO_3$ can be preferably used.

By performing firing at a temperature in such a range, a solid phase reaction occurs at an interface between the active material molded body 2 and the solid electrolyte layer 3 due to mutual diffusion of elements constituting the respective members, and the production of electrochemically inactive by-products can be suppressed. Further, the crystallinity of the inorganic solid electrolyte is improved, and thus, the ion conductivity of the solid electrolyte layer 3 can be improved. In addition, at the interface between the active material molded body 2 and the solid electrolyte layer 3, a sintered portion is generated, and thus, charge transfer at the interface is facilitated. Accordingly, the capacity and the output power of a lithium battery using the electrode assembly 10 are improved.

The firing may be performed by performing a heat treatment once, or may be performed by dividing the heat treatment into a first heat treatment in which the precursor is adhered to the surface of the porous body and a second heat treatment in which heating is performed at a temperature not lower than the treatment temperature in the first heat treatment and 700° C. or lower. By performing the firing by such a stepwise heat treatment, the solid electrolyte layer 3 can be easily formed at a desired position.

Figure 4A:
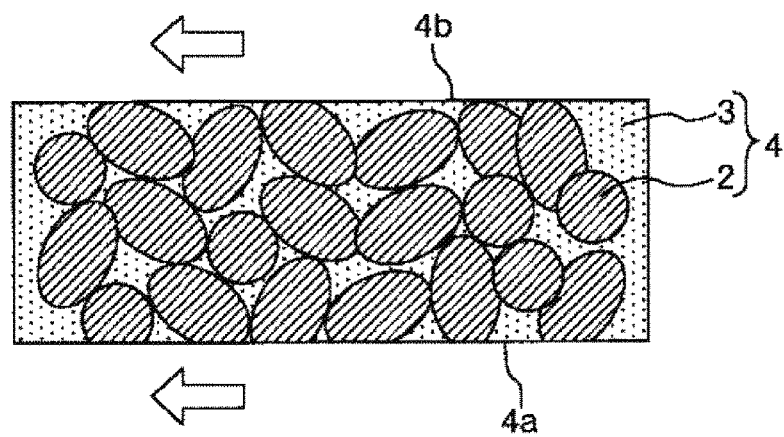
FIGS. 4A to 4C are views for illustrating a method for producing the lithium secondary battery shown in FIG. 1.

[3] Subsequently, by grinding and polishing both surfaces 4a and 4b of the composite body 4, both of the active material molded body 2 and the solid electrolyte layer 3 are exposed from these surfaces 4a and 4b (see FIG. 4A).

At this time, on both of the one surface 4a and the other surface 4b, a scratch mark (a grinding and polishing mark), which is a mark of the grinding and polishing process is left.

Incidentally, when the composite body 4 is formed in the above-mentioned step [2], both of the active material molded body 2 and the solid electrolyte layer 3 are sometimes exposed from both surfaces 4a and 4b. In this case, grinding and polishing of both surfaces 4a and 4b of the composite body 4 can be omitted.

Figure 4B:
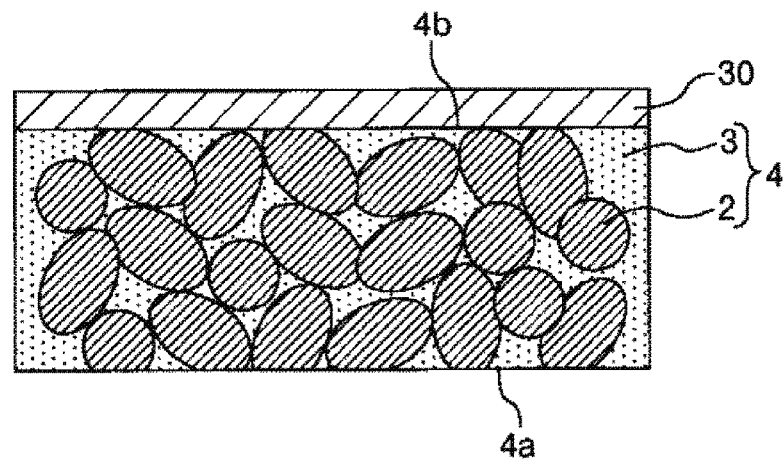

[4] Subsequently, by supplying a composition for forming a lithium reduction resistant layer (the composition for forming a lithium reduction resistant layer according to the invention) to be used for forming the lithium reduction resistant layer 30 containing the above-mentioned Compound I onto the other surface 4b of the composite body 4, a liquid coating film is formed, and thereafter, by heating this liquid coating film, the lithium reduction resistant layer 30 containing a compound represented by the above general formula (I) is obtained (see FIG. 4B).

Hereinafter, this step [4] will be described in detail.

[4-1] First, a composition for forming a lithium reduction resistant layer (precursor composition) is prepared, and thereafter, a liquid coating film is formed on the other surface 4b by using this composition for forming a lithium reduction resistant layer (a first step).

The composition for forming a lithium reduction resistant layer (the composition for forming a lithium reduction resistant layer according to the invention) is used for forming the lithium reduction resistant layer 30 containing the above-mentioned Compound I and is a liquid reactant containing a solvent, and a lithium compound, a lanthanum compound, a zirconium compound, and a compound containing the above-mentioned metal M, each of which shows solubility in the solvent, and in which with respect to the stoichiometric composition of the above-mentioned Compound I, the lithium compound is contained in an amount 1.05 times or more and 2.50 times or less, the lanthanum compound and the zirconium compound are contained in an amount 0.70 times or more and 1.00 times or less, and the compound containing the above-mentioned metal M is contained in an equal amount.

The lithium compound, the lanthanum compound, the zirconium compound, and the compound containing the above-mentioned metal M are not particularly limited, but are preferably at least either a metal salt or a metal alkoxide of each of lithium, lanthanum, zirconium, and the above-mentioned metal M. According to this, the above-mentioned Compound I can be obtained at a high production ratio from the composition for forming a lithium reduction resistant layer, which is a mixture of these compounds.

Examples of such a lithium compound (lithium source) include lithium metal salts such as lithium chloride, lithium nitrate, lithium acetate, lithium hydroxide, and lithium carbonate, and lithium alkoxides such as lithium methoxide, lithium ethoxide, lithium propoxide, lithium isopropoxide, lithium butoxide, lithium isobutoxide, lithium sec-butoxide, lithium tert-butoxide, and dipivaloylmethanatolithium, and among these, one compound can be used or two or more compounds can be used in combination.

Examples of the lanthanum compound (lanthanum source) include lanthanum metal salts such as lanthanum chloride, lanthanum nitrate, and lanthanum acetate, and lanthanum alkoxides such as lanthanum methoxide, lanthanum ethoxide, lanthanum propoxide, lanthanum isopropoxide, lanthanum butoxide, lanthanum isobutoxide, lanthanum sec-butoxide, lanthanum tert-butoxide, and dipivaloylmethanatolanthanum, and among these, one compound can be used or two or more compounds can be used in combination.

Examples of the zirconium compound (zirconium source) include zirconium metal salts such as zirconium chloride, zirconium oxychloride, zirconium oxynitrate, zirconium oxyacetate, and zirconium acetate, and zirconium alkoxides such as zirconium methoxide, zirconium ethoxide, zirconium propoxide, zirconium isopropoxide, zirconium butoxide, zirconium isobutoxide, zirconium sec-butoxide, zirconium tert-butoxide, and dipivaloylmethanatozirconium, and among these, one compound can be used or two or more compounds can be used in combination.

Examples of the compound containing the above-mentioned metal M, in the case where the metal M is niobium, include niobium metal salts such as niobium chloride, niobium oxychloride, and niobium oxalate, niobium alkoxides such as niobium ethoxide, niobium propoxide, niobium isopropoxide, and niobium sec-butoxide, and niobium acetylacetonate, and among these, one compound can be used or two or more compounds can be used in combination.

As the solvent, a solvent capable of dissolving each of the lithium compound, the lanthanum compound, the zirconium compound, and the compound containing the above-mentioned metal M is used, and a single solvent such as water or an organic solvent, or a mixed solvent is used. According to this, the lithium compound, the lanthanum compound, the zirconium compound, and the compound containing the above-mentioned metal M can be reliably dissolved in the composition for forming a lithium reduction resistant layer.

The organic solvent is not particularly limited, but examples thereof include methanol, ethanol, n-propyl alcohol, isopropyl alcohol, and allyl alcohol; glycols such as ethylene glycol, propylene glycol, butylene glycol, hexylene glycol, pentane diol, hexane diol, heptane diol, and dipropylene glycol; ketones such as acetone, methyl ethyl ketone, methyl propyl ketone, and methyl isobutyl ketone; esters such as methyl formate, ethyl formate, methyl acetate, and methyl acetoacetate; and ethers such as diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether.

The formation of the liquid coating film on the other surface 4b is performed by supplying the composition for forming a lithium reduction resistant layer onto the other surface 4b, however, this supply of the composition for forming a lithium reduction resistant layer is preferably performed using a coating method. By using the coating method, the liquid coating film having a uniform film thickness, and as a result, the lithium reduction resistant layer 30 having a uniform film thickness can be easily formed on the other surface 4b.

The coating method is not particularly limited, and examples thereof include a spin coating method, a casting method, a micro gravure coating method, a gravure coating method, a bar coating method, a roll coating method, a wire bar coating method, a dip coating method, a spray coating method, a screen printing method, a flexographic printing method, an offset printing method, a micro contact printing method, and a liquid droplet ejection method.

Further, in the composition for forming a lithium reduction resistant layer, the lithium compound, the lanthanum compound, the zirconium compound, and the compound containing the above-mentioned metal M are contained at a compositional ratio as described above, and according to this, the gelation of the composition for forming a lithium reduction resistant layer is suppressed or prevented over a long period of time, so that the composition for forming a lithium reduction resistant layer can be maintained in a sol state stably over a long period of time. Due to this, the liquid coating film to be formed by supplying the composition for forming a lithium reduction resistant layer onto the other surface 4b can be obtained as a film having a more uniform thickness. Accordingly, the lithium reduction resistant layer to be obtained in the subsequent step [4-2] can be made to have a more uniform thickness.

[4-2] Subsequently, by heating the liquid coating film, the lithium reduction resistant layer 30 containing Compound I is formed on the other surface 4b (a second step).

Here, in the invention, the compositional ratio of the lithium compound, the lanthanum compound, the zirconium compound, and the compound containing the above-mentioned metal M contained in the composition for forming a lithium reduction resistant layer constituting the liquid coating film falls within a specific range. That is, with respect to the stoichiometric composition of the above-mentioned Compound I, the lithium compound is contained in an amount 1.05 times or more and 2.50 times or less, the lanthanum compound and the zirconium compound are contained in an amount 0.70 times or more and 1.00 times or less, and the compound containing the above-mentioned metal M is contained in an equal amount. By setting the compositional ratio as described above, a ceramic material to be produced by a liquid phase reaction caused by heating the liquid coating film (the composition for forming a lithium reduction resistant layer) can be obtained at a high production ratio in terms of Compound I. As a result, the lithium reduction resistant layer 30 containing this Compound I shows excellent Li ion conductivity and Li reduction resistance.

As described above, by using the composition for forming a lithium reduction resistant layer according to the invention, the lithium reduction resistant layer 30 containing this Compound I can be formed by producing Compound I through one step of heating the liquid coating film (the composition for forming a lithium reduction resistant layer).

It has been revealed according to the study by the present inventors that Compound I is obtained by heating (a heat treatment) of the composition for forming a lithium reduction resistant layer which is the liquid coating film (liquid material) depending on the compositional ratio of the lithium compound, the lanthanum compound, the zirconium compound, and the compound containing the above-mentioned metal M described above regardless of the types of these compounds.

For example, in the case where lithium carbonate is used as the lithium compound, lithium carbonate also functions as a sintering additive, and a sintering effect that the crystallization (grain growth) of Compound I is promoted is obtained, however, if the lithium compound is contained in an amount exceeding 2.50 times (for example, 3.0 times), Compound I is decomposed, and $La_2Zr_2O_3$ and $La_2O_3$ which are contaminants are generated. Further, if the lithium compound is contained in an amount less than 1.05 times, La$_2$Zr$_2$O$_3$ which is a contaminant is generated, and also the sintering effect of lithium carbonate is not sufficiently obtained.

Further, the lithium compound may be contained in an amount 1.05 times or more and 2.50 times or less, but is preferably contained in an amount 1.25 times or more and 2.50 times or less. According to this, crystals (primary particles) of Compound I having a smaller particle diameter are formed, and thus, it becomes possible to set the porosity of a porous body obtained by sintering particle bodies (secondary particles) formed by granulating the primary particles low, and therefore, the ion conductivity of the lithium reduction resistant layer 30 can be improved.

If each of the lanthanum compound and the zirconium compound is contained in an amount less than 0.70 times, La$_2$Zr$_2$O$_3$ which is a contaminant is generated, and also the production ratio of Compound I tends to decrease remarkably. Further, if each of the lanthanum compound and the zirconium compound is contained in an amount exceeding 1.00 times, La$_2$Zr$_2$O$_3$ which is a contaminant tends to be generated.

The heating of this liquid coating film (liquid material) is preferably performed under the temperature conditions that the highest temperature is set to 900° C. or lower, more preferably performed under the temperature conditions that the highest temperature is set to 800° C. or lower. According to this, Compound I to be produced by heating can be formed to have a cubic garnet-type crystal structure. As a result, the obtained lithium reduction resistant layer 30 shows more excellent ion conductivity. Further, by performing heating in a low temperature range in which the highest temperature is set to 800° C. or lower, the denaturation or degeneration of the constituent materials of the active material molded body 2 and the solid electrolyte layer 3 included in the composite body 4 can be reliably suppressed or prevented.

Further, the heating of the liquid coating film (liquid material) is preferably performed by a multistage heating treatment including a first heating treatment, a second heating treatment, and a third heating treatment in which Compound I is sintered. In such a multistage heating treatment, in the first heating treatment, the liquid coating film is dried, and in the second heating treatment, metal oxides of lithium, lanthanum, zirconium, and the above-mentioned metal M are formed. For example, in the case of Li, Li$_2$CO$_3$ is formed through Li$_2$O by reacting Li$_2$O with CO$_2$ in the air. Then, in the third heating treatment, Compound I is produced, and also the crystals of the produced Compound I are subjected to grain growth, and the crystals of Compound I formed into particles are sintered. That is, in the first heating treatment, the liquid coating film is dried, and in the second heating treatment, oxides of the respective metal components constituting Compound I are formed. Then, in the third heating treatment, Compound I is produced, and also the crystals are subjected to grain growth, and the crystals of Compound I formed into particles are sintered.

By forming the lithium reduction resistant layer 30 containing Compound I through such a stage, in the lithium reduction resistant layer 30, Compound I can be formed to have a cubic garnet-type crystal structure, and also adjacent crystals of Compound I in the form of particles can be sintered with each other, and therefore, the lithium reduction resistant layer 30 shows more excellent ion conductivity.

In this case, the heating temperature in the first heating treatment is preferably 50° C. or higher and 250° C. or lower, more preferably 150° C. or higher and 200° C. or lower.

Further, the heating temperature in the second heating treatment is preferably 400° C. or higher and 550° C. or lower, more preferably 500° C. or higher and 550° C. or lower.

Further, the heating temperature in the third heating treatment is preferably 600° C. or higher and 900° C. or lower, more preferably 650° C. or higher and 800° C. or lower.

By setting the heating temperature in each of the first to third heating treatments in the above-mentioned range, Compound I having a cubic garnet-type crystal structure can be obtained at a higher production ratio.

Further, the heating time for the liquid coating film in the whole step is preferably 10 minutes or more and 2 hours or less, more preferably 10 minutes or more and 1.5 hours or less.

Further, in this step [4], as described above, the lithium reduction resistant layer 30 is formed by supplying the composition for forming a lithium reduction resistant layer in a liquid phase onto the other surface 4$b$ of the composite body 4 in a solid phase. Therefore, on the other surface 4$b$, the composition for forming a lithium reduction resistant layer wets and spreads on the active material molded body 2 and the solid electrolyte layer 3 exposed from the other surface 4$b$, thereby forming a liquid coating film, and then, this liquid coating film is heated, whereby the lithium reduction resistant layer 30 is formed. Therefore, an interface between the lithium reduction resistant layer 30 and the active material molded body 2, and an interface between the lithium reduction resistant layer 30 and the solid electrolyte layer 3 formed in the other surface 4$b$ become a continuous layer (solid solution) in which the lithium reduction resistant layer 30 and the active material molded body 2 are solid-dissolved, and a continuous layer (solid solution) in which the lithium reduction resistant layer 30 and the solid electrolyte layer 3 are solid-dissolved, respectively. According to this, the resistivity at an interface between the lithium reduction resistant layer 30 and the composite body 4 is decreased, and as a result, the transfer of lithium ions at the interface is carried out more smoothly.

Further, as described above, the lithium reduction resistant layer 30 obtained in this step [4] is constituted by a porous body including communication holes (pores), and in the case where a filling section filled with a filling material which is an amorphous material at room temperature is formed in this communication hole, after this step [4], a filling material which is an amorphous material at room temperature is supplied onto the lithium reduction resistant layer 30, and thereafter, the filling material may be heated. According to this, the filling section can be reliably formed. Further, the temperature at which the filling material is heated can be set in the same manner as the heating conditions in this step [4].

Figure 4C:
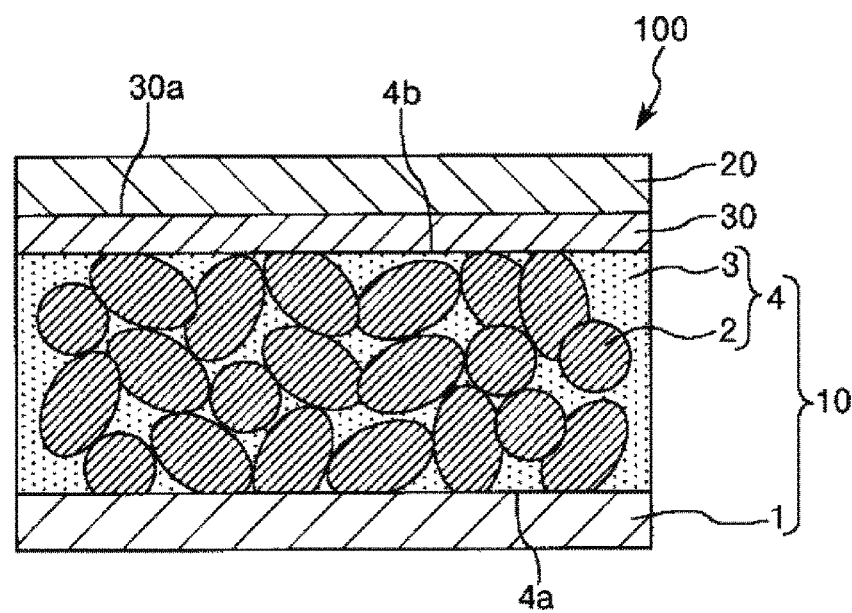

[5] Subsequently, as shown in FIG. 4C, the current collector 1 is bonded to the one surface 4$a$ of the composite body 4, and also the electrode 20 is bonded to the one surface 30$a$ of the lithium reduction resistant layer 30.

The bonding of the current collector 1 may be performed by bonding the current collector formed as a separate body to the one surface 4$a$ of the composite body 4, or the current collector 1 may be formed on the one surface 4$a$ of the composite body 4 by depositing the material for forming the current collector 1 described above on the one surface 4$a$ of the composite body 4.

Further, the bonding of the electrode 20 may be performed by bonding the electrode formed as a separate body to the one surface 30$a$ of the lithium reduction resistant layer 30, or the electrode 20 may be formed on the one surface 30a of the lithium reduction resistant layer 30 by depositing the material for forming the electrode 20 described above on the one surface 30a of the lithium reduction resistant layer 30.

As the deposition methods for the current collector 1 and the electrode 20, various physical vapor phase growth methods (PVD) and chemical vapor phase growth methods (CVD) can be used, respectively.

By undergoing the steps as described above, the lithium secondary battery 100 is produced.

Second Embodiment

Next, a second embodiment of the lithium secondary battery according to the invention will be described.

Figure 5:
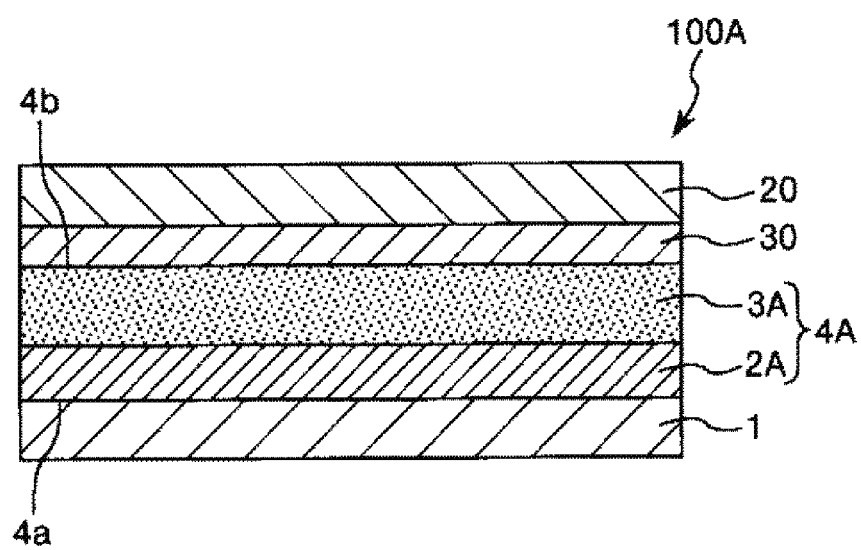
FIG. 5 is a longitudinal cross-sectional view showing a second embodiment of a lithium secondary battery according to the invention.

FIG. 5 is a longitudinal cross-sectional view showing a second embodiment of the lithium secondary battery according to the invention.

Hereinafter, with respect to a lithium secondary battery 100A of the second embodiment, different points from the above-mentioned lithium secondary battery 100 of the first embodiment will be mainly described, and a description of the same matter will be omitted.

The lithium secondary battery 100A shown in FIG. 5 is configured in the same manner as the lithium secondary battery 100 shown in FIG. 1 except that a composite body 4A having a different configuration from that of the composite body 4 is provided between the current collector 1 and the lithium reduction resistant layer 30 by being bonded to the current collector 1 and the lithium reduction resistant layer 30.

That is, in the lithium secondary battery 100A of the second embodiment, the composite body 4A is configured such that an active material molded body 2A in the form of a layer and a solid electrolyte layer 3A in the form of a layer are stacked in this order from the current collector 1 side to the electrode 20 side, and one surface 4a of the composite body 4A is constituted by the active material molded body 2A alone and the other surface 4b of the composite body 4A is constituted by the solid electrolyte layer 3A alone.

Such a lithium secondary battery 100A is configured such that the solid electrolyte layer 3A and the lithium reduction resistant layer 30 are stacked on each other, and at an interface between the lithium reduction resistant layer 30 and the solid electrolyte layer 3A, a continuous layer (solid solution) in which the lithium reduction resistant layer 30 and the solid electrolyte layer 3A are solid-dissolved is formed in the same manner as the first embodiment. According to this, the resistivity at an interface between the lithium reduction resistant layer 30 and the composite body 4A (solid electrolyte layer 3A) is decreased, and as a result, the transfer of lithium ions at the interface is carried out more smoothly.

Also according to such a lithium secondary battery 100A of the second embodiment, the same effect as that of the first embodiment is obtained.

Hereinabove, the composition for forming a lithium reduction resistant layer, the method for forming a lithium reduction resistant layer, and the lithium secondary battery according to the invention have been described based on the embodiments shown in the drawings, however, the invention is not limited thereto.

For example, the configuration of each part in the lithium secondary battery according to the invention can be replaced with an arbitrary configuration having a similar function, and also an arbitrary configuration may be added. Further, the invention may be composed of two or more arbitrary configurations (features) in combination in the above-mentioned embodiments.

Further, in the method for forming a lithium reduction resistant layer according to the invention, one or more arbitrary steps may be added.

EXAMPLES

Next, specific examples of the invention will be described.

1. Preparation of Solutions of Respective Metal Compounds
Preparation of Butanol Solution of 1.0 Mol/Kg Lithium Nitrate Lithium nitrate (1.3789 g) and butanol (18.6211 g) were weighed and placed in a 30-g reagent bottle made of Pyrex (registered trademark) equipped with a magnetic stirrer bar, and stirred at room temperature for 30 minutes using a magnetic stirrer to dissolve lithium nitrate completely, whereby a butanol solution of 1.0 mol/kg lithium nitrate was obtained.

Preparation of Toluene/Propionic Acid Solution of 1.0 mol/kg Lithium Acetate

Lithium acetate (1.3198 g), toluene (13.0761 g), and propionic acid (5.6041 g) were weighed and placed in a 30-g reagent bottle made of Pyrex (registered trademark) equipped with a magnetic stirrer bar, and stirred at 80° C. for 30 minutes using a magnetic stirrer with a temperature regulator to dissolve lithium acetate completely. Then, the resulting solution was gradually cooled to room temperature, whereby a toluene/propionic acid solution of 1.0 mol/kg lithium acetate was obtained.

Preparation of Propionic Acid Solution of 1.0 mol/kg Lithium Acetate

Lithium acetate (1.3198 g) and propionic acid (18.6802 g) were weighed and placed in a 30-g reagent bottle made of Pyrex (registered trademark) equipped with a magnetic stirrer bar, and stirred at 80° C. for 30 minutes using a magnetic stirrer with a temperature regulator to dissolve lithium acetate completely. Then, the resulting solution was gradually cooled to room temperature, whereby a propionic acid solution of 1.0 mol/kg lithium acetate was obtained.

Preparation of 2-Butoxyethanol Solution of 2.0 mol/kg Lithium Nitrate

Lithium nitrate (2.758 g) and 2-butoxyethanol (17.242 g) were weighed and placed in a 30-g reagent bottle made of Pyrex (registered trademark) equipped with a magnetic stirrer bar, and stirred at 160° C. for 30 minutes using a magnetic stirrer with a temperature regulator to dissolve lithium nitrate completely, whereby a 2-butoxyethanol solution of 2.0 mol/kg lithium nitrate was obtained.

Preparation of Ethanol Solution of 1.0 mol/kg Lithium Nitrate

Lithium nitrate (0.690 g) and ethanol (9.310 g) were weighed and placed in a 30-g reagent bottle made of Pyrex (registered trademark) equipped with a magnetic stirrer bar, and stirred at 160° C. for 30 minutes using a magnetic stirrer with a temperature regulator to dissolve lithium nitrate completely, whereby an ethanol solution of 1.0 mol/kg lithium nitrate was obtained.

Preparation of Toluene/2-Butoxyethanol Solution of 0.4 mol/kg Lanthanum 2-Ethylhexanoate Lanthanum 2-ethylhexanoate (2.2741 g), toluene (5.4081 g), and 2-butoxyethanol (2.3178 g) were weighed and placed in a 20-g reagent bottle made of Pyrex (registered trademark), and ultrasound was applied thereto at room temperature using an ultrasonic cleaner to dissolve lanthanum 2-ethylhexanoate completely, whereby a toluene/2-butoxyethanol solution of 0.4 mol/kg lanthanum 2-ethylhexanoate was obtained.

Preparation of Propionic Acid Solution of 0.4 mol/kg Lanthanum Acetate 1.5-Hydrate Lanthanum acetate 1.5-hydrate (2.7445 g) and propionic acid (17.2555 g) were weighed and placed in a 30-g reagent bottle made of Pyrex (registered trademark) equipped with a magnetic stirrer bar, and stirred at 80° C. for 30 minutes using a magnetic stirrer with a temperature regulator to dissolve lanthanum acetate 1.5-hydrate completely. Then, the resulting solution was gradually cooled to room temperature, whereby a propionic acid solution of 0.4 mol/kg lanthanum acetate 1.5-hydrate was obtained.

Preparation of 2-Butoxyethanol Solution of 1.0 mol/kg Lanthanum Nitrate 6-Hydrate Lanthanum nitrate 6-hydrate (4.330 g) and 2-butoxyethanol (5.670 g) were weighed and placed in a 30-g reagent bottle made of Pyrex (registered trademark) equipped with a magnetic stirrer bar, and stirred at 80° C. for 30 minutes using a magnetic stirrer with a temperature regulator to dissolve lanthanum nitrate 6-hydrate completely. Then, the resulting solution was gradually cooled to room temperature, whereby a 2-butoxyethanol solution of 1.0 mol/kg lanthanum nitrate 6-hydrate was obtained.

Preparation of Ethanol Solution of 1.0 mol/kg Lanthanum Nitrate 6-Hydrate

Lanthanum nitrate 6-hydrate (4.330 g) and ethanol (5.670 g) were weighed and placed in a 30-g reagent bottle made of Pyrex (registered trademark) equipped with a magnetic stirrer bar, and stirred at 80° C. for 30 minutes using a magnetic stirrer with a temperature regulator to dissolve lanthanum nitrate 6-hydrate completely. Then, the resulting solution was gradually cooled to room temperature, whereby an ethanol solution of 1.0 mol/kg lanthanum nitrate 6-hydrate was obtained.

Preparation of Butanol Solution of 1.0 mol/kg Zirconium Butoxide

Zirconium butoxide (3.8368 g) and butanol (6.1632 g) were weighed and placed in a 20-g reagent bottle made of Pyrex (registered trademark) equipped with a magnetic stirrer bar, and stirred at 80° C. for 30 minutes. Then, the resulting solution was gradually cooled to room temperature, whereby a butanol solution of 1.0 mol/kg zirconium butoxide was obtained.

Preparation of Propionic Acid Solution of 0.4 mol/kg Zirconium Acrylate

Zirconium acrylate (3.0020 g) and propionic acid (16.9980 g) were weighed and placed in a 30-g reagent bottle made of Pyrex (registered trademark) equipped with a magnetic stirrer bar, and stirred at 80° C. for 30 minutes using a magnetic stirrer with a temperature regulator to dissolve zirconium acrylate completely. Then, the resulting solution was gradually cooled to room temperature, whereby a propionic acid solution of 0.4 mol/kg zirconium acrylate was obtained.

Preparation of 2-Butoxyethanol Solution of 1.0 mol/kg Zirconium Butoxide

Zirconium butoxide (7.674 g) and 2-butoxyethanol (12.326 g) were weighed and placed in a 20-g reagent bottle made of Pyrex (registered trademark) equipped with a magnetic stirrer bar, and stirred at 80° C. for 30 minutes. Then, the resulting solution was gradually cooled to room temperature, whereby a 2-butoxyethanol solution of 1.0 mol/kg zirconium butoxide was obtained.

Preparation of Ethanol Solution of 1.0 mol/kg Zirconium Butoxide

Zirconium butoxide (7.674 g) and ethanol (12.326 g) were weighed and placed in a 20-g reagent bottle made of Pyrex (registered trademark) equipped with a magnetic stirrer bar, and stirred at 80° C. for 30 minutes. Then, the resulting solution was gradually cooled to room temperature, whereby an ethanol solution of 1.0 mol/kg zirconium butoxide was obtained.

Preparation of 2-Butoxyethanol Solution of 1.0 mol/kg Niobium Pentaethoxide

Niobium pentaethoxide (3.1821 g) and 2-butoxyethanol (6.8179 g) were weighed and placed in a 10-g reagent bottle made of Pyrex (registered trademark) equipped with a magnetic stirrer bar, and stirred at 80° C. for 30 minutes using a magnetic stirrer with a temperature regulator. Then, the resulting solution was gradually cooled to room temperature, whereby a 2-butoxyethanol solution of 1.0 mol/kg niobium pentaethoxide was obtained.

Preparation of Ethanol Solution of 1.0 mol/kg Niobium Pentaethoxide

Niobium pentaethoxide (3.182 g) and ethanol (6.818 g) were weighed and placed in a 10-g reagent bottle made of Pyrex (registered trademark) equipped with a magnetic stirrer bar, and stirred at 80° C. for 30 minutes using a magnetic stirrer with a temperature regulator. Then, the resulting solution was gradually cooled to room temperature, whereby an ethanol solution of 1.0 mol/kg niobium pentaethoxide was obtained.

Preparation of 2-Butoxyethanol Solution of 1.0 mol/kg Tantalum Pentaethoxide

Tantalum pentaethoxide (3.182 g) and 2-butoxyethanol (6.818 g) were weighed and placed in a 10-g reagent bottle made of Pyrex (registered trademark) equipped with a magnetic stirrer bar, and stirred at 80° C. for 30 minutes using a magnetic stirrer with a temperature regulator. Then, the resulting solution was gradually cooled to room temperature, whereby a 2-butoxyethanol solution of 1.0 mol/kg tantalum pentaethoxide was obtained.

2. Preparation of Composition for Forming Lithium Reduction Resistant Layer

Example 1: Preparation of $Li_{6.9}La_3(Zr_{1.9}, Nb_{0.1})O_{12}$ Precursor Solution The propionic acid solution of 1.0 mol/kg lithium acetate (10.350 g), the propionic acid solution of 0.4 mol/kg lanthanum acetate 1.5-hydrate (6.375 g), the 2-butoxyethanol solution of 1.0 mol/kg zirconium butoxide (1.615 g), and the 2-butoxyethanol solution of 1.0 mol/kg niobium pentaethoxide (0.100 g) were weighed and mixed by heating for 30 minutes using a hot plate at 90° C. Then, the resulting solution was gradually cooled to room temperature, whereby a $Li_{6.9}La_3(Zr_{1.9}, Nb_{0.1})O_{12}$ precursor solution was obtained.

Example 2: Preparation of $Li_{5.1}La_3(Zr_{0.1}, Nb_{1.9})O_{12}$ Precursor Solution The butanol solution of 1.0 mol/kg lithium nitrate (12.750 g), the toluene/2-butoxyethanol solution of 0.4 mol/kg lanthanum 2-ethylhexanoate (5.250 g), the butanol solution of 1.0 mol/kg zirconium butoxide (0.070 g), and the 2-butoxyethanol solution of 1.0 mol/kg niobium pentaethoxide (1.900 g) were weighed and mixed by heating for 30 minutes using a hot plate at 90° C. Then, the resulting solution was gradually cooled to room temperature, whereby a $Li_{5.1}La_3(Zr_{0.1}, Nb_{1.9})O_{12}$ precursor solution was obtained.

Example 3: Preparation of $Li_{6.75}La_3(Zr_{1.75}, Nb_{0.25})O_{12}$ Precursor Solution The toluene/propionic acid solution of 1.0 mol/kg lithium acetate (10.125 g), the toluene/2-butoxyethanol solution of 0.4 mol/kg lanthanum 2-ethylhexanoate (5.250 g), the propionic acid solution of 0.4 mol/kg zirconium acrylate (3.719 g), and the 2-butoxyethanol solution of 1.0 mol/kg niobium pentaethoxide (0.250 g) were weighed and mixed by heating for 30 minutes using a hot plate at 90° C. Then, the resulting solution was gradually cooled to room temperature, whereby a $Li_{6.75}La_3(Zr_{1.75}, Nb_{0.25})O_{12}$ precursor solution was obtained.

Example 4: Preparation of $Li_{6.75}La_3(Zr_{1.75}, Nb_{0.25})O_{12}$ Precursor Solution The propionic acid solution of 1.0 mol/kg lithium acetate (10.125 g), the toluene/2-butoxyethanol solution of 0.4 mol/kg lanthanum 2-ethylhexanoate (6.375 g), the butanol solution of 1.0 mol/kg zirconium butoxide (1.313 g), and the 2-butoxyethanol solution of 1.0 mol/kg niobium pentaethoxide (0.250 g) were weighed and mixed by heating for 30 minutes using a hot plate at 90° C. Then, the resulting solution was gradually cooled to room temperature, whereby a $Li_{6.75}La_3(Zr_{1.75}, Nb_{0.25})O_{12}$ precursor solution was obtained.

Example 5: Preparation of $Li_{6.75}La_3(Zr_{1.75}, Nb_{0.25})O_{12}$ Precursor Solution The propionic acid solution of 1.0 mol/kg lithium acetate (13.500 g), the toluene/2-butoxyethanol solution of 0.4 mol/kg lanthanum 2-ethylhexanoate (6.000 g), the propionic acid solution of 0.4 mol/kg zirconium acrylate (3.500 g), and the 2-butoxyethanol solution of 1.0 mol/kg niobium pentaethoxide (0.250 g) were weighed and mixed by heating for 30 minutes using a hot plate at 90° C. Then, the resulting solution was gradually cooled to room temperature, whereby a $Li_{6.75}La_3(Zr_{1.75}, Nb_{0.25})O_{12}$ precursor solution was obtained.

Example 6: Preparation of $Li_{6.6}La_3(Zr_{1.6}, Nb_{0.4})O_{12}$ Precursor Solution The butanol solution of 1.0 mol/kg lithium nitrate (11.813 g), the propionic acid solution of 0.4 mol/kg lanthanum acetate 1.5-hydrate (5.625 g), the butanol solution of 1.0 mol/kg zirconium butoxide (1.280 g), and the 2-butoxyethanol solution of 1.0 mol/kg niobium pentaethoxide (0.400 g) were weighed and mixed by heating for 30 minutes using a hot plate at 90° C. Then, the resulting solution was gradually cooled to room temperature, whereby a $Li_{6.6}La_3(Zr_{1.6}, Nb_{0.4})O_{12}$ precursor solution was obtained.

Example 7: Preparation of $Li_{6.0}La_3(Zr_{1.0}, Nb_{1.0})O_{12}$ Precursor Solution The propionic acid solution of 1.0 mol/kg lithium acetate (13.500 g), the toluene/2-butoxyethanol solution of 0.4 mol/kg lanthanum 2-ethylhexanoate (5.250 g), the propionic acid solution of 0.4 mol/kg zirconium acrylate (1.875 g), and the 2-butoxyethanol solution of 1.0 mol/kg niobium pentaethoxide (1.000 g) were weighed and mixed by heating for 30 minutes using a hot plate at 90° C. Then, the resulting solution was gradually cooled to room temperature, whereby a $Li_{6.0}La_3(Zr_{1.4}, Nb_{1.4})O_{12}$ precursor solution was obtained.

Example 8: Preparation of $Li_{5.5}La_3(Zr_{0.5}, Nb_{1.5})O_{12}$ Precursor Solution The propionic acid solution of 1.0 mol/kg lithium acetate (11.000 g), the toluene/2-butoxyethanol solution of 0.4 mol/kg lanthanum 2-ethylhexanoate (6.000 g), the propionic acid solution of 0.4 mol/kg zirconium acrylate (0.938 g), and the 2-butoxyethanol solution of 1.0 mol/kg niobium pentaethoxide (1.500 g) were weighed and mixed by heating for 30 minutes using a hot plate at 90° C. Then, the resulting solution was gradually cooled to room temperature, whereby a $Li_{5.5}La_3(Zr_{0.5}, Nb_{1.5})O_{12}$ precursor solution was obtained.

Example 9: Preparation of $Li_{6.6}La_3(Zr_{1.6}, Nb_{0.2}, Ta_{0.2})O_{12}$ Precursor Solution The 2-butoxyethanol solution of 2.0 mol/kg lithium nitrate (6.600 g), the 2-butoxyethanol solution of 1.0 mol/kg lanthanum nitrate 6-hydrate (2.400 g), the 2-butoxyethanol solution of 1.0 mol/kg zirconium butoxide (1.20 g), the 2-butoxyethanol solution of 1.0 mol/kg niobium pentaethoxide (0.200 g), and the 2-butoxyethanol solution of 1.0 mol/kg tantalum pentaethoxide (0.200 g) were weighed and mixed by heating for 30 minutes using a hot plate at 90° C. Then, the resulting solution was gradually cooled to room temperature, whereby a $Li_{6.6}La_3(Zr_{1.6}, Nb_{0.2}, Ta_{0.2})O_{12}$ precursor solution was obtained.

Example 10: Preparation of $Li_{6.8}La_3(Zr_{1.8}, Nb_{0.2})O_{12}$ Precursor Solution The 2-butoxyethanol solution of 2.0 mol/kg lithium nitrate (6.800 g), the 2-butoxyethanol solution of 1.0 mol/kg lanthanum nitrate 6-hydrate (2.400 g), the 2-butoxyethanol solution of 1.0 mol/kg zirconium butoxide (1.35 g), and the 2-butoxyethanol solution of 1.0 mol/kg niobium pentaethoxide (0.200 g) were weighed and mixed by heating for 30 minutes using a hot plate at 90° C. Then, the resulting solution was gradually cooled to room temperature, whereby a $Li_{6.8}La_3(Zr_{1.8}, Nb_{0.2})O_{12}$ precursor solution was obtained.

Example 11: Preparation of $Li_{6.8}La_3(Zr_{1.8}, Nb_{0.2})O_{12}$ Precursor Solution The 2-butoxyethanol solution of 2.0 mol/kg lithium nitrate (6.800 g), the 2-butoxyethanol solution of 1.0 mol/kg lanthanum nitrate 6-hydrate (2.400 g), the 2-butoxyethanol solution of 1.0 mol/kg zirconium butoxide (1.80 g), and the 2-butoxyethanol solution of 1.0 mol/kg niobium pentaethoxide (0.200 g) were weighed and mixed by heating for 30 minutes using a hot plate at 90° C. Then, the resulting solution was gradually cooled to room temperature, whereby a $Li_{6.8}La_3(Zr_{1.8}, Nb_{0.2})O_{12}$ precursor solution was obtained.

Example 12: Preparation of $Li_{6.8}La_3(Zr_{1.8}, Nb_{0.2})O_{12}$ Precursor Solution The 2-butoxyethanol solution of 2.0 mol/kg lithium nitrate (5.100 g), the 2-butoxyethanol solution of 1.0 mol/kg lanthanum nitrate 6-hydrate (2.400 g), the 2-butoxyethanol solution of 1.0 mol/kg zirconium butoxide (1.80 g), and the 2-butoxyethanol solution of 1.0 mol/kg niobium pentaethoxide (0.200 g) were weighed and mixed by heating for 30 minutes using a hot plate at 90° C. Then, the resulting solution was gradually cooled to room temperature, whereby a $Li_{6.8}La_3(Zr_{1.8}, Nb_{0.2})O_{12}$ precursor solution was obtained.

Example 13: Preparation of $Li_{6.8}La_3(Zr_{1.8}, Nb_{0.2})O_{12}$ Precursor Solution The 2-butoxyethanol solution of 2.0 mol/kg lithium nitrate (4.250 g), the 2-butoxyethanol solution of 1.0 mol/kg lanthanum nitrate 6-hydrate (2.400 g), the 2-butoxyethanol solution of 1.0 mol/kg zirconium butoxide (1.80 g), and the 2-butoxyethanol solution of 1.0 mol/kg niobium pentaethoxide (0.200 g) were weighed and mixed by heating for 30 minutes using a hot plate at 90° C. Then, the resulting solution was gradually cooled to room temperature, whereby a $Li_{6.8}La_3(Zr_{1.8}, Nb_{0.2})O_{12}$ precursor solution was obtained.

Example 14: Preparation of $Li_{6.75}La_3(Zr_{1.75}, Nb_{0.25})O_{12}$ Precursor Solution The ethanol solution of 1.0 mol/kg lithium nitrate (7.090 g), the ethanol solution of 1.0 mol/kg lanthanum nitrate 6-hydrate (2.400 g), the ethanol solution of 1.0 mol/kg zirconium butoxide (1.75 g), and the ethanol solution of 1.0 mol/kg niobium pentaethoxide (0.250 g) were weighed and mixed by heating for 30 minutes using a hot plate at 90° C. Then, the resulting solution was gradually cooled to room temperature, whereby a $Li_{6.75}La_3(Zr_{1.75}, Nb_{0.25})O_{12}$ precursor solution was obtained.

Comparative Example 1: Preparation of $Li_{6.75}La_3(Zr_{1.75}, Nb_{0.25})O_{12}$ Precursor Solution The propionic acid solution of 1.0 mol/kg lithium acetate (6.750 g), the propionic acid solution of 0.4 mol/kg lanthanum acetate 1.5-hydrate (5.250 g), the propionic acid solution of 0.4 mol/kg zirconium acrylate (3.063 g), and the 2-butoxyethanol solution of 1.0 mol/kg niobium pentaethoxide (0.250 g) were weighed and mixed by heating for 30 minutes using a hot plate at 90° C. Then, the resulting solution was gradually cooled to room temperature, whereby a $Li_{6.75}La_3(Zr_{1.75}, Nb_{0.25})O_{12}$ precursor solution was obtained.

Comparative Example 2: Preparation of $Li_{6.75}La_3(Zr_{1.75}, Nb_{0.25})O_{12}$ Precursor Solution The butanol solution of 1.0 mol/kg lithium nitrate (6.750 g), the toluene/2-butoxyethanol solution of 0.4 mol/kg lanthanum 2-ethylhexanoate (7.875 g), the propionic acid solution of 0.4 mol/kg zirconium acrylate (4.594 g), and the 2-butoxyethanol solution of 1.0 mol/kg niobium pentaethoxide (0.250 g) were weighed and mixed by heating for 30 minutes using a hot plate at 90° C. Then, the resulting solution was gradually cooled to room temperature, whereby a $Li_{6.75}La_3(Zr_{1.75}, Nb_{0.25})O_{12}$ precursor solution was obtained.

Comparative Example 3: Preparation of $Li_{6.75}La_3(Zr_{1.75}, Nb_{0.25})O_{12}$ Precursor Solution The propionic acid solution of 1.0 mol/kg lithium acetate (17.213 g), the toluene/2-butoxyethanol solution of 0.4 mol/kg lanthanum 2-ethylhexanoate (5.250 g), the propionic acid solution of 0.4 mol/kg zirconium acrylate (3.062 g), and the 2-butoxyethanol solution of 1.0 mol/kg niobium pentaethoxide (0.250 g) were weighed and mixed by heating for 30 minutes using a hot plate at 90° C. Then, the resulting solution was gradually cooled to room temperature, whereby a $Li_{6.75}La_3(Zr_{1.75}, Nb_{0.25})O_{12}$ precursor solution was obtained.

Comparative Example 4: Preparation of $Li_{6.75}La_3(Zr_{1.75}, Nb_{0.25})O_{12}$ Precursor Solution The propionic acid solution of 1.0 mol/kg lithium acetate (18.563 g), the toluene/2-butoxyethanol solution of 0.4 mol/kg lanthanum 2-ethylhexanoate (7.875 g), the propionic acid solution of 0.4 mol/kg zirconium acrylate (4.594 g), and the 2-butoxyethanol solution of 1.0 mol/kg niobium pentaethoxide (0.250 g) were weighed and mixed by heating for 30 minutes using a hot plate at 90° C. Then, the resulting solution was gradually cooled to room temperature, whereby a $Li_{6.75}La_3(Zr_{1.75}, Nb_{0.25})O_{12}$ precursor solution was obtained.

The amount of each metal compound with respect to the stoichiometric composition of the above-mentioned Compound I in each of the compositions for forming a lithium reduction resistant layer of the respective Examples and Comparative Examples is shown in Table 1.

TABLE 1

| | x | Li compound (times) | La compound (times) | Zr compound (times) | Nb and Ta compounds (times) |
|---|---|---|---|---|---|
| Example 1 | 0.10 | 1.50 | 0.85 | 0.85 | 1.00 |
| Example 2 | 1.90 | 2.50 | 0.70 | 0.70 | 1.00 |
| Example 3 | 0.25 | 1.50 | 0.70 | 0.85 | 1.00 |
| Example 4 | 0.25 | 1.50 | 0.85 | 0.70 | 1.00 |
| Example 5 | 0.25 | 2.00 | 0.80 | 0.80 | 1.00 |
| Example 6 | 0.40 | 1.75 | 0.75 | 0.80 | 1.00 |
| Example 7 | 1.00 | 2.25 | 0.70 | 0.75 | 1.00 |
| Example 8 | 1.50 | 2.00 | 0.80 | 0.75 | 1.00 |
| Example 9 | 0.40 | 2.00 | 0.80 | 0.75 | 1.00 |
| Example 10 | 0.20 | 2.00 | 0.80 | 0.75 | 1.00 |
| Example 11 | 0.20 | 2.00 | 0.80 | 1.00 | 1.00 |
| Example 12 | 0.20 | 1.50 | 0.80 | 1.00 | 1.00 |
| Example 13 | 0.20 | 1.25 | 0.80 | 1.00 | 1.00 |
| Example 14 | 0.25 | 1.05 | 0.80 | 1.00 | 1.00 |
| Comparative Example 1 | 0.25 | 1.00 | 0.70 | 0.70 | 1.00 |
| Comparative Example 2 | 0.25 | 1.00 | 1.05 | 1.05 | 1.00 |
| Comparative Example 3 | 0.25 | 2.55 | 0.70 | 0.70 | 1.00 |
| Comparative Example 4 | 0.25 | 2.75 | 1.05 | 1.05 | 1.00 |

3. Formation of Lithium Reduction Resistant Layer

First, as a base material, a single crystal silicon substrate (20 mm (length)×20 mm (width)) was prepared, and on this base material, each of the compositions for forming a lithium reduction resistant layer of Examples 1 to 8 excluding Example 6, and the respective Comparative Examples was supplied, whereby a liquid coating film was formed.

Subsequently, the liquid coating film was heated at 700° C. for 0.5 hours, whereby a lithium reduction resistant layer was formed on the base material.

As for the composition for forming a lithium reduction resistant layer of Example 6, a lithium reduction resistant layer was formed on a base material as follows.

That is, on a single crystal silicon substrate (20 mm (length)×20 mm (width)), the composition for forming a lithium reduction resistant layer (precursor solution) of Example 6 was applied by a spray coating method. Then, the temperature was raised at 10° C./min from room temperature, and the solvent was dried at 180° C. for 5 minutes.

Thereafter, the temperature was further raised at 10° C./min, and heating was performed at 500° C. for 10 minutes, whereby a precursor film was obtained. In this Example 6, while heating was performed at 500° C. for 10 minutes, in the flux of lithium nitrate, the respective oxides of lithium, lanthanum, zirconium, and niobium were formed on the single crystal silicon substrate, and while cooling to room temperature, lithium oxide reacted with $CO_2$ in the air, whereby lithium carbonate was formed.

4. Evaluation of Lithium Reduction Resistant Layer 4.1. I-V Characteristics

The I-V characteristics were determined for the respective lithium reduction resistant layers formed on the base materials using the compositions for forming a lithium reduction resistant layer of Examples 1 to 8 and the respective Comparative Examples.

The I-V characteristics were determined by cyclic voltammetry using a potentiostat/galvanostat meter ("μ-Autolab II", manufactured by International Chemistry Co., Ltd.), and a potential window was evaluated. An evaluation cell was prepared by forming an Au electrode as a working electrode on one surface of a polycrystalline pellet of each Example, and pressing lithium metal as a counter electrode against the other surface thereof. The potential of the working electrode was operated within the range from –0.5 V to 9V (vs. $Li^+$/Li). In the case of Examples 1 to 8, an electric current other than an electric current associated with the dissolution/deposition of lithium in the vicinity of 0 V (vs. $Li^+$/Li) was not observed. Based on these results, it can be said that the compounds of Examples 1 to 8 each have a very wide potential window, that is, the compounds have high Li reduction resistance.

4.2. Analysis by X-Ray Diffraction

An X-ray diffraction spectrum was obtained for each of the lithium reduction resistant layers formed on the base materials using the compositions for forming a lithium reduction resistant layer of Examples 1 to 8 and the respective Comparative Examples, and evaluation was performed for the obtained X-ray diffraction spectrum according to the following definition.

That is, it was defined that the intensities at $2\theta \approx 30.7°$ ($Li_{7-x}La_3(Zr_{2-x},Nb_x)O_{12}$, 0<X<2) and $2\theta \approx 27.3°$ ($La_2Zr_2O_3$) were compared, and when the intensity ratio was in the range of 0 to 2/100, it can be determined that the compound is ($Li_{7-x}La_3(Zr_{2-x},Nb_x)O_{12}$, 0<X<2) with no contaminants.

Figure 6:
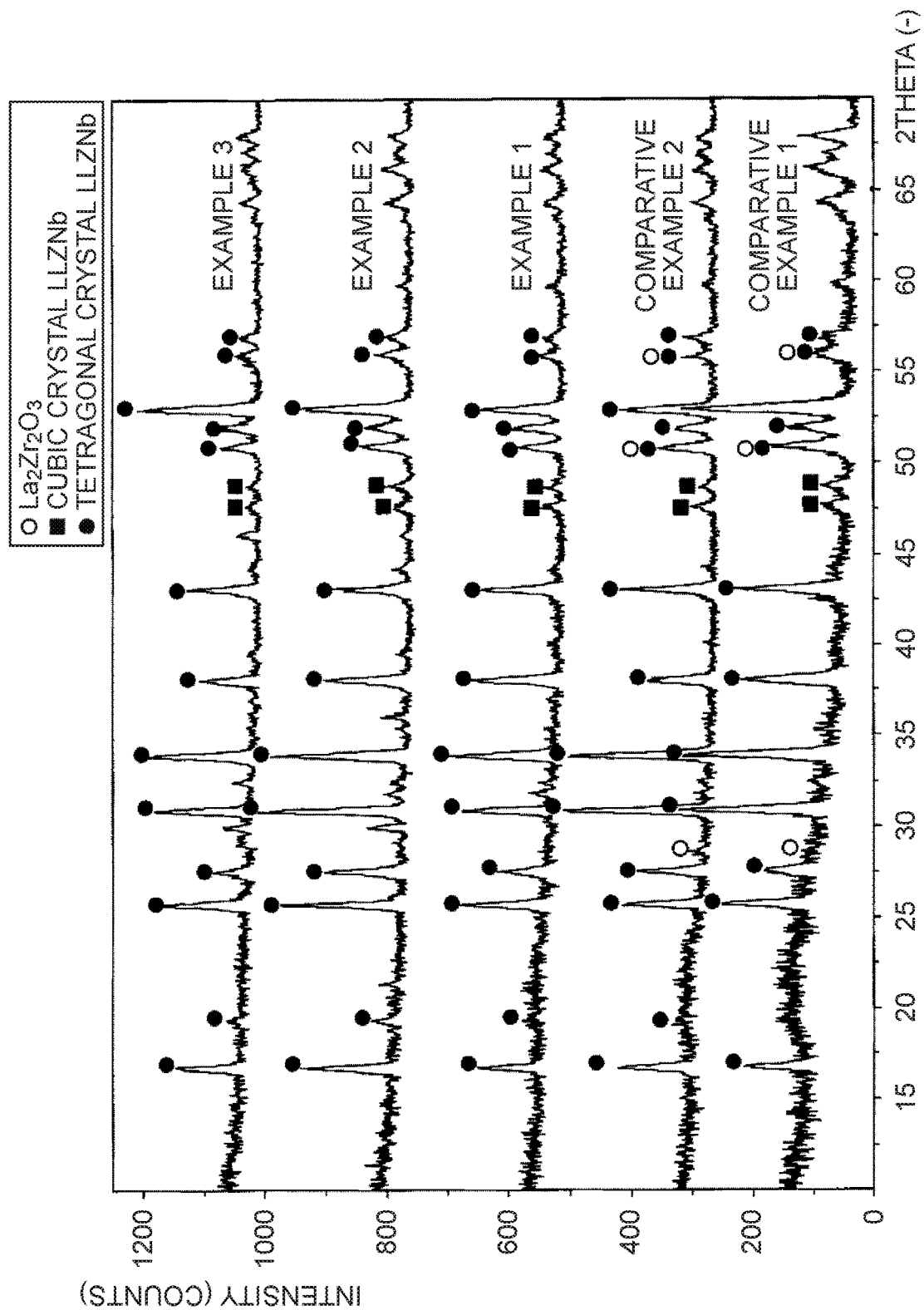
FIG. 6 shows X-ray diffraction spectra measured for Examples 1 to 3 and Comparative Examples 1 and 2.

The X-ray diffraction spectra measured for Examples 1 to 3 and Comparative Examples 1 and 2 are shown in FIG. 6 for reference.

As a result, in the case of Examples 1 to 8, the above-mentioned intensity ratio was 0 ($La_2Zr_2O_3$ did not exist) in each case, and in the case of Comparative Examples 1 to 4, the above-mentioned intensity ratio exceeded 100/100, and the main phase was $La_2Zr_2O_3$ in each case.

5. Molding of Final Fired Product Using Composition for Forming Lithium Reduction Resistant Layer Each of the compositions for forming a lithium reduction resistant layer of Examples 9, 10, and 14 was heated at 180° C. for 0.5 hours to dry the solvent, followed by heating at 360° C. for 0.5 hours to degrade the ligand, and thereafter temporary firing was performed by heating at 540° C. for 1.0 hours, whereby a temporary fired product was obtained. Subsequently, the temporary fired product was placed in an alumina crucible and the crucible was closed with a lid. Then, final firing was performed at 700° C. for 8.0 hours in an electric muffle furnace, whereby a final fired product was obtained.

Further, each of the compositions for forming a lithium reduction resistant layer of Examples 11 to 13 was applied by a spray coating method onto an LCO ($LiCoO_2$) pellet (10 m ϕ, manufactured by Toshima Manufacturing Co., Ltd.) with a high bulk density, and then, the temperature was raised at 10° C./min from room temperature, and the solvent was dried at 180° C. for 5 minutes. Thereafter, the temperature was further raised at 10° C./min, and the ligand was degraded at 360° C. for 5 minutes, and then, the temperature was raised at 10° C./min, and temporary firing was performed at 540° C. for 30 minutes, whereby a temporary fired product was obtained. Subsequently, the temporary fired product was placed in an alumina crucible and the crucible was closed with a lid. Then, final firing was performed at 700° C. for 8.0 hours in an electric muffle furnace, whereby a final fired product molded on the LCO pellet was obtained.

6. Analysis of Final Fired Product by X-Ray Diffraction

Figure 7:
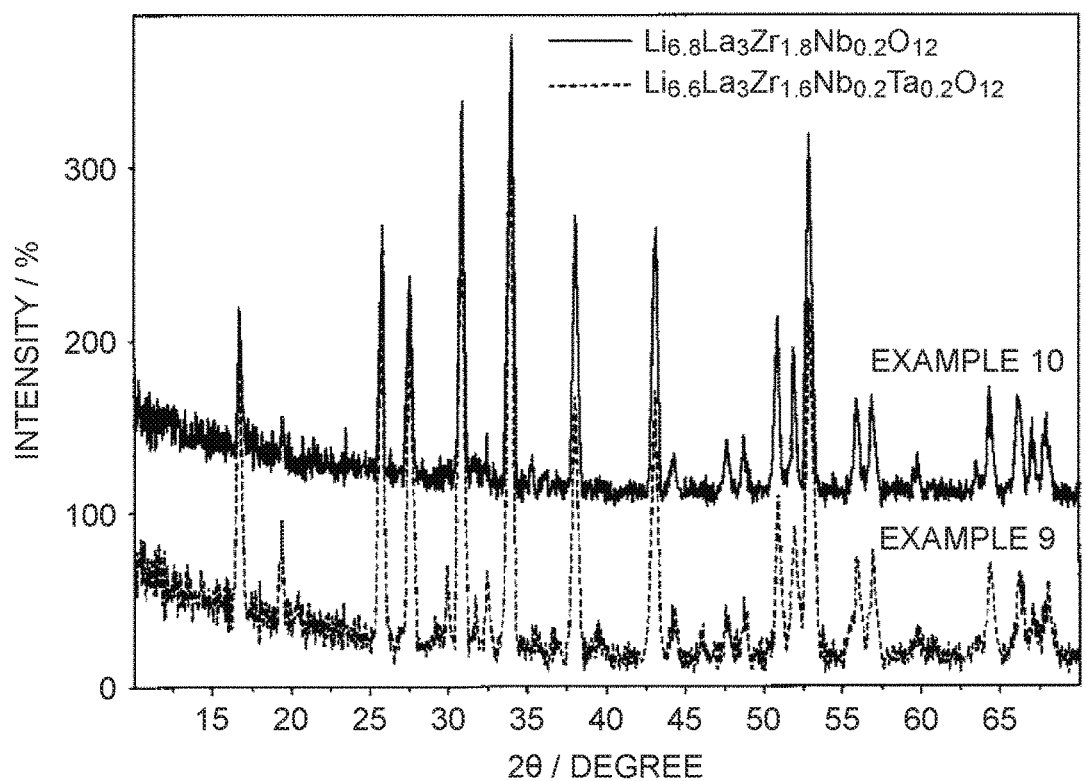
FIG. 7 shows X-ray diffraction spectra measured for Examples 9, 10, and 14.
Figure 7:
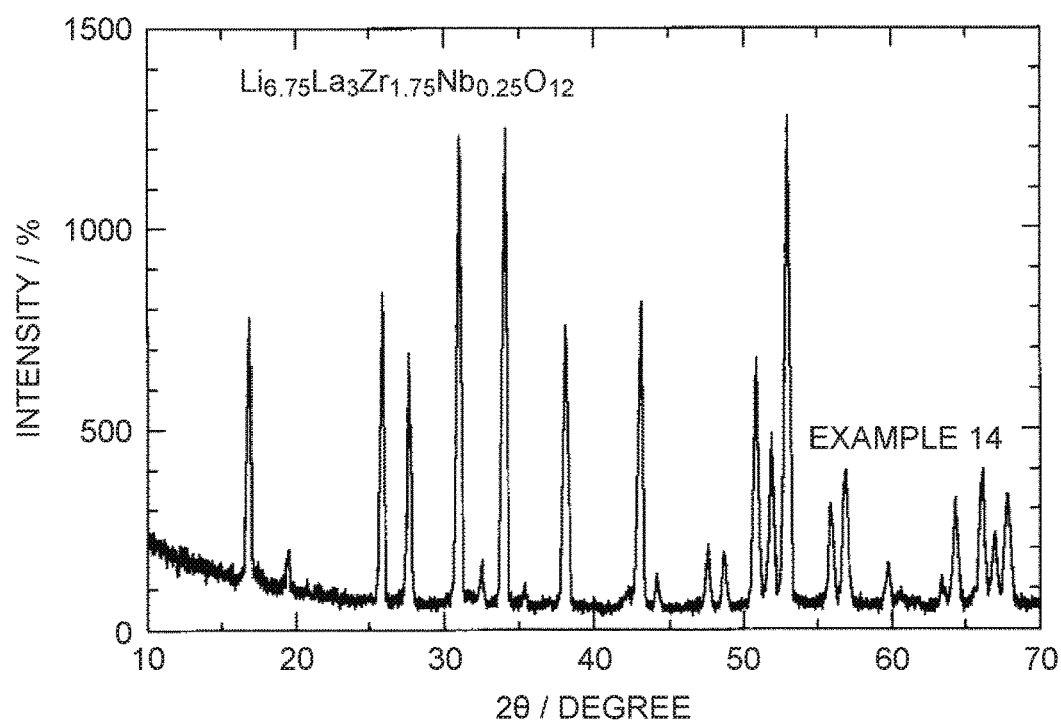
Figure 8:
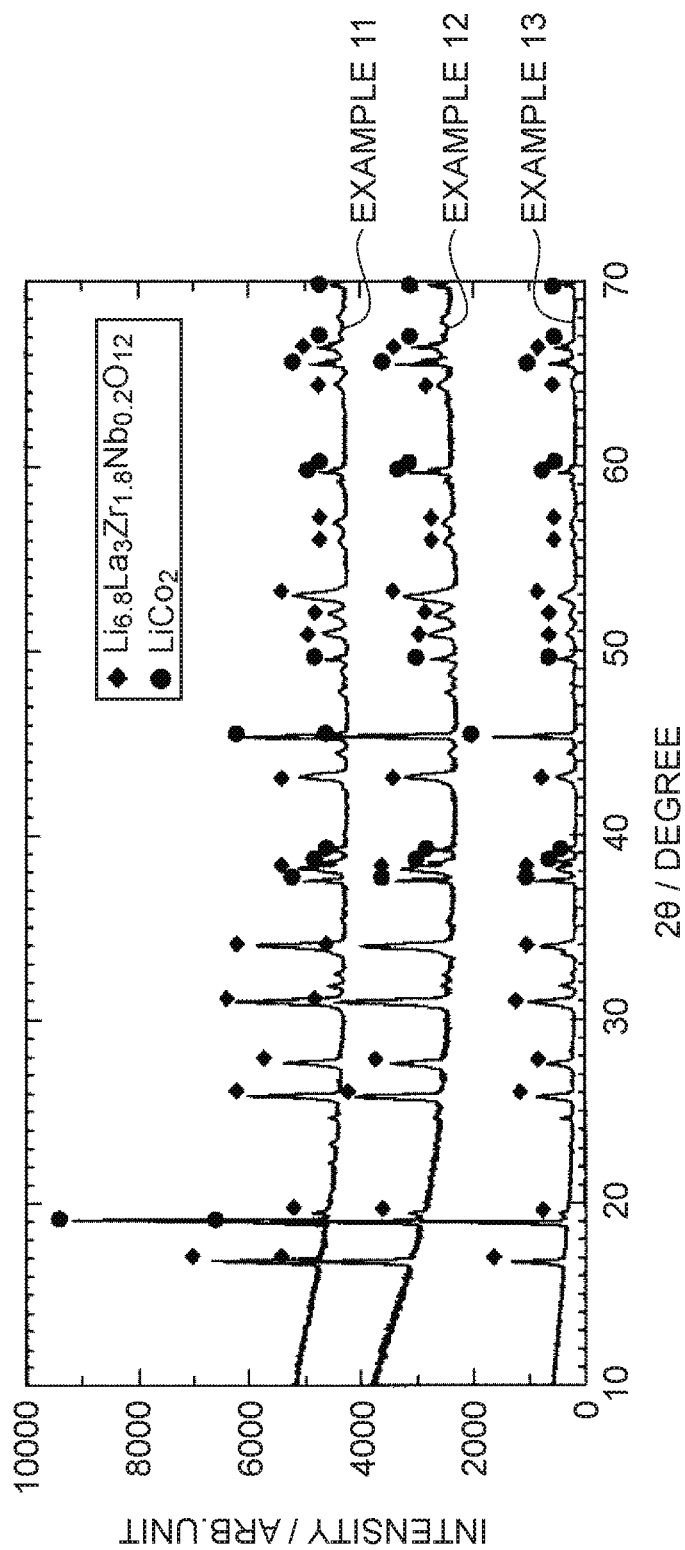
FIG. 8 shows X-ray diffraction spectra measured for Examples 11 to 13.

An X-ray diffraction spectrum was obtained for each of the final fired products obtained by using the compositions for forming a lithium reduction resistant layer of Examples 9 to 14. The results are shown in FIGS. 7 and 8.

As a result, in the case of Examples 9 to 14, final fired products constituted by the objective compound were obtained in each case.

What is claimed is:

1. A composition for forming a lithium reduction resistant layer, comprising:
    a solvent;
    a lithium compound;
    a lanthanum compound;
    a zirconium compound; and
    a compound containing a metal M, the metal M containing Nb and Ta,
    wherein the lithium compound, the lanthanum compound, the zirconium compound, and the compound containing the metal M each show solubility in the solvent,
    the lithium compound is contained in an amount 2.00 times or more and 2.50 times or less with respect to the stoichiometric composition of a compound represented by the general formula (I),
    the lanthanum compound is contained in an amount 0.70 times or more and 0.80 times or less with respect to the stoichiometric composition of the compound represented by the general formula (I),
    the zirconium compound is contained in an amount 0.70 times or more and 0.75 times or less with respect to the stoichiometric composition of the compound represented by the general formula (I), and
    the compound containing the metal M is contained in an equal amount with respect to the stoichiometric composition of the compound represented by the general formula (I):

$$Li_{7-x}La_3(Zr_{2-x},M_x)O_{12} \qquad (I)$$

wherein the metal M represents two or more metals selected from Nb, Sc, Ti, V, Y, Hf, Ta, Al, Si, Ga, Ge, Sn, and Sb, and X represents 1.4 to 2.

2. The composition for forming a lithium reduction resistant layer according to claim 1, wherein the lithium compound is at least one compound selected from a lithium metal salt compound and a lithium alkoxide compound,
    the lanthanum compound is at least one compound selected from a lanthanum metal salt compound and a lanthanum alkoxide compound,
    the zirconium compound is at least one compound selected from a zirconium metal salt compound and a zirconium alkoxide compound, and the compound containing a metal M is at least one compound selected from a metal salt compound of the metal M and a metal alkoxide compound of the metal M.

3. The composition for forming a lithium reduction resistant layer according to claim 1, wherein the solvent is any of water, a single organic solvent, a mixed solvent containing water and at least one organic solvent, and a mixed solvent containing at least two or more organic solvents.

4. A method for forming a lithium reduction resistant layer, comprising:
  forming a liquid coating film using the composition for forming a lithium reduction resistant layer according to claim 1; and
  heating the liquid coating film,
  wherein a lithium reduction resistant layer containing the compound represented by the general formula (I) is obtained.

5. The method for forming a lithium reduction resistant layer according to claim 4, wherein the liquid coating film is formed by using a coating method.

6. The method for forming a lithium reduction resistant layer according to claim 4, wherein the heating of the liquid coating film includes a first heating treatment for drying the liquid coating film, a second heating treatment for producing metal oxides of lithium, lanthanum, zirconium, and the metal M, and a third heating treatment for producing and sintering the compound represented by the general formula (I).

7. The method for forming a lithium reduction resistant layer according to claim 6, wherein the heating temperature in the first heating treatment is 50° C. or higher and 250° C. or lower.

8. The method for forming a lithium reduction resistant layer according to claim 6, wherein the heating temperature in the second heating treatment is 400° C. or higher and 550° C. or lower.

9. The method for forming a lithium reduction resistant layer according to claim 6, wherein the heating temperature in the third heating treatment is 600° C. or higher and 900° C. or lower.

* * * * *